United States Patent [19]

Kato et al.

[11] Patent Number: 5,478,229
[45] Date of Patent: Dec. 26, 1995

[54] APPARATUS FOR FORMING HOLLOW ARTICLE

[75] Inventors: Takaaki Kato; Kiyomi Suzuki; Shigeharu Hagiwara; Hiroaki Takanashi, all of Yokohama, Japan

[73] Assignee: The Japan Steel Works, Ltd., Tokyo, Japan

[21] Appl. No.: 182,936

[22] Filed: Jan. 18, 1994

[30] Foreign Application Priority Data

Jan. 29, 1993 [JP] Japan .................................. 5-013684
Jan. 29, 1993 [JP] Japan .................................. 5-013685

[51] Int. Cl.⁶ .................................................. B29C 49/10
[52] U.S. Cl. ...................... 425/529; 264/532; 425/531; 425/532; 425/535; 425/541
[58] Field of Search ...................... 425/532, 531, 425/535, 540, 541, 527, 529; 264/532

[56] References Cited

U.S. PATENT DOCUMENTS

| | | | |
|---|---|---|---|
| 2,349,176 | 5/1944 | Kopitke | 425/540 X |
| 3,632,267 | 1/1972 | Kader | 425/540 X |
| 3,837,780 | 9/1974 | Strong | 425/531 X |
| 4,239,474 | 12/1980 | Nakagawa | 425/532 X |
| 5,229,143 | 7/1993 | Ogura et al. | 425/541 X |

FOREIGN PATENT DOCUMENTS 1179197 11/1971 Germany.
3002192 7/1981 Germany.

OTHER PUBLICATIONS

Blow Forming document, pp. 45–52; published in Japan in 1970.
Blow Molding Machine Catalog of Japan Steel Works, Ltd. published in Japan in 1990.

Primary Examiner—Richard L. Chiesa
Attorney, Agent, or Firm—Brooks Haidt Haffner & Delahunty

[57] ABSTRACT

An apparatus for forming a hollow article, wherein all the operations such as shifting and opening/closing of a die are performed by electric actuators such as motors which operate in accordance with a program operation, thus improving the quality of the hollow article as the product. A parison extruded from an extruder is introduced into and held in a die which has been opened by the operation of a die compacting motor. A crosshead associated with the extruder is lifted to draw the parison, and a parison cutting motor operates to cut the drawn parison. Thus, fully automatic production is realized, to ensure high yield of the product.

19 Claims, 14 Drawing Sheets

(DIE CLOSED)

(DIE OPENED)

APPARATUS FOR FORMING HOLLOW ARTICLE

BACKGROUND OF THE INVENTION

The present invention relates to an apparatus for forming a hollow article in which devices such as a die shifter, die compacting device and air blowing nozzle are electrically driven to operate automatically under a predetermined program, thus achieving improvement in the quality of the hollow article as the product.

Hitherto, apparatus for forming hollow articles employed hydraulic or pneumatic driving systems as shown in FIGS. 1 and 2.

Each of these known driving systems includes a bed 1, a base 2 situated on the bed 1, and an extruder 3 carried by the base 2. The extruder 3 has a hopper 4, a cylinder 6 receiving a screw 5, and a crosshead 7. An air blowing device 8 fixed to a frame 9 carried by the bed ] is disposed adjacent to the extruder 3.

The air blowing device 8 has an air blowing nozzle 10 which is adapted to move up and down as indicated by an arrow A by means of a blowing device driving hydraulic cylinder 8A. A die 13 is disposed under the crosshead 7 and the air blowing device 8. The die 13 is adapted to be moved in the direction of an arrow B by means of a die shifting device 12 which is actuated by a die shifting hydraulic cylinder 11. The die 13 is so constructed as to be opened and closed by a compacting device 15 having a hydraulic cylinder 14.

The blowing device driving hydraulic cylinder 8A, die shifting hydraulic cylinder 1] and the compacting hydraulic cylinder 14 are supplied with hydraulic oil from a hydraulic unit 16 which is mounted in the base 2. A parison cutting device 2 is actuated by a pneumatic cylinder 20 provided in the frame 9 so as to cut the parison 22.

The oil displaced from the hydraulic unit 16 is supplied to the compacting hydraulic cylinder ]4 of the die compacting device 15 so as to open and close the die ]3. The oil also is supplied to the die shifting hydraulic cylinder of the die shifting device ]2 so as to effect shifting of the die ]3. The oil also is supplied to the blowing device driving hydraulic cylinder 8A so as to drive the air blowing nozzle 10 up and down.

In operation, a molten resin extruded from the cylinder 6 is introduced to a crosshead 7 so as to form a cylindrical parison 22 suspended from the crosshead 7. The cylindrical parison 22 is introduced into the die 13. When the length of the parison 22 has reached a predetermined value, the die 13 is closed to clamp the parison 22. Then, the parison 22 is cut at its upper portion by the parison cutting device 21 while the die 13 is shifted obliquely downward by the operation of the die shifting device ]2.

Subsequently, the air blowing nozzle 10 is inserted into the parison 22 to blow air into the parison 22, whereby the parison 22 is inflated in conformity with the internal configuration of the die 13. The molten resin forming the parison 22 is then cooled and solidified, whereby the desired hollow article is obtained.

The known method and apparatus for forming a hollow article have suffered from the following problems due to the construction described above.

The pressurized oil tends to leak from the hydraulic unit, hydraulic cylinder and piping so as to contaminate the formed product. In particular, leak of oil from the air blowing device hydraulic cylinder causes a serious defect because such leaking oil may enter the hollow article product such as a bottle which is disposed under this hydraulic cylinder.

The temperature of the oil is low in the beginning of the operation but is gradually raised, which varies the viscosity of the oil as the apparatus over a operates long period of time. This change in the viscosity causes a change in the displacement of the oil from the oil unit to vary the speed of operation of the hydraulic cylinder and the position at which the hydraulic cylinder is stopped, with the result that the quality of the product fluctuates of defective articles are produced.

Stabilization of the oil temperature requires warm-up operation which takes a considerably long time. In addition, the hydraulic unit must be equipped with a specific oil temperature control device which raises the cost of the whole apparatus.

Furthermore, the pump/motor of the hydraulic unit continuously operates even when none of the hydraulic cylinders is operating, thus wasting energy.

Furthermore, energy is wastefully consumed due to pressure drop or resistance to the flow of the oil along the piping which interconnects the hydraulic unit and each hydraulic cylinder. It is also necessary to supply a cooler or an oil tank with cooling water in order to regulate the temperature of the oil which otherwise will rise during the operation. Consequently, the cost of operating the apparatus is considerably increased due to use of cooling water at a large rate.

The forming operation may require that the die be stopped at a position intermediate the full open and full closed positions. In such a case, the die may fail to stop at the desired position or may continue to move slowly beyond the desired position, due to internal leakage of the oil inside the hydraulic cylinder or solenoid valve or due to the influence of back pressure in the hydraulic cylinder. This causes a critical problem from the viewpoint of safety, as well as production of defective products.

The velocity of movement of the cutting blade of the parison cutting device is determined by the rate of supply of the air supplied to the pneumatic cylinder and, hence, tends to vary during the operation due to a variation in the air source pressure. This also leads to production of defective articles. The rate of supply of the air is controllable manually by varying the degree of opening of an orifice valve. This control relies upon experience and perception of the operator and, therefore, tends to vary according to individual operators. It has therefore been difficult to obtain a high degree of reproducibility of production conditions. The conventional parison cutting device which is operated pneumatically tends to be affected by disturbance due to the compressible nature of air. Driving of the cutting device by a hydraulic actuator also leads to unstable operation due to change in the oil viscosity caused by a change in the oil temperature. Simultaneous use of pneumatic and hydraulic actuators cannot provide fine or delicate control of the cutting device, so that the control is coarse, which impairs the reliability of operation.

A problem also is caused due to the fact that the parison is cut while it is being drawn obliquely between the stationary crosshead and the obliquely die. The problem resides in that the cut parison does not exhibit exact cylindrical form with a horizontal cut edge but, instead the inner side of the parison tends to be collapsed. Consequently, the end of the air blowing nozzle forcibly displaces the parison when the nozzle is inserted into the parison. This makes it difficult to obtain a product such as a bottle having the expected configuration of the neck, thus lowering the product yield from the apparatus.

SUMMARY OF THE INVENTION

It is a primary object of the present invention is to provide an apparatus for producing a hollow article in which all the operations such as die shifting, die compacting, vertical driving of the air blowing nozzle and so forth are effected by electric actuators so as to be automatically controllable in accordance with a program and in which the drawing of the parison is effected by vertically moving the crosshead to obtain a flat, horizontally cut edge providing a trumpet form of the parison, thereby overcoming the above-described problems of the known art.

To this end, according to one aspect of the present invention, there is provided apparatus for forming a hollow article, wherein a cylindrical parison is downwardly extruded from an extruder via a crosshead at a position directly under the crosshead by means of a die provided in a compacting device which operates to open and close by means of a compacting motor. The crosshead is moved upwardly by means of a parison drawing motor while the parison is held by the die thereby drawing the parison, and then the parison is cut at a position above the die by means of a parison cutting device which is operated by a parison cutting motor. The die holding the parison is shifted from the position directly under the crosshead to a position directly under an air blowing device by means of a die shifting device which is reciprocally driven by a die shifting motor. An air blowing nozzle which is vertically driven by an air blowing device driving motor is moved into the parison from the upper side of the parison so as to blow air into the parison. The parison is thus inflated in the die and is then cooled in the die so as to form the hollow article.

The compacting motor, the parison drawing motor, the parison cutting motor, the die shifting motor and the air blowing device driving motor may be A.C. servomotors.

The arrangement may be such that the blowing of air into the parison is conducted while the end of the nozzle is pressed into the upper face of the die with a constant pressure, any upper burr is removed by the pressing force simultaneously with the formation of the hollow article.

The arrangement also may be such that the current generated in the A.C. servomotor used as the compacting motor is detected and compared with a set value, and the torque of the servomotor is limited or the servomotor is stopped when the detected current exceeds the set value.

According to another aspect of the present invention, there is provided an apparatus or forming a hollow article, comprising: a crosshead; a die for holding a parison suspended from the crosshead; a compacting device for opening and closing the die; an air blowing device including a vertically movable air blowing nozzle for blowing air into the parison held by the die; a die shifting device for shifting the mold from a position directly under the crosshead to a position directly under the air blowing device; a parison drawing device for upwardly moving the crosshead so as to draw the parison; a parison cutting device for cutting the parison drawn by the parison drawing device; and means for supplying air to the air blowing device so that air is blown into the cut parison held in the die, thereby forming the hollow article in the die.

The parison cutting device may include: a cutter holder which holds an electric-heater type cutter for cutting the parison; a plurality of shafts fixed to a stationary part and movably supporting the cutter holder; a follower member for moving the cutter holder; and a parison cutting motor for moving the electric-heater type cutter through the intermediary of the follower member.

Preferably, the parison cutting motor operates under the control of a control unit which is operable to allow independent change and setting of the velocities of movement of the electric-heater type cutter during forward stroking and backward stroking thereof.

It is also preferred that the electric-heater type cutter cuts the parison either in the forward stroking or backward stroking thereof.

It is also preferred that the parison drawing device may include: a swing base carrying an extruder equipped with the crosshead; a swing base tilting section for tilting the swing base; and a parison drawing motor provided on the swing base tilting section and operable to tilt the swing base; wherein the parison is cut by the electric-heater type cutter while the crosshead is held in the raised position.

It is also preferred that the compacting device may include: a die actuating mechanism for opening and closing the die and having a rear plate; a die holder; a toggle mechanism disposed between the rear plate and the die holder; a guide block provided on the joint portion of the toggle mechanism; a feed screw screwed into the guide block; and a compacting motor for rotatingly driving the feed screw.

It is also preferred that the die shifting device may include: a movable base for moving the compacting device; a plurality of guide rods for supporting the movable base; a rotary screw for causing movement of the movable base; a nut for screwing engagement with the rotary screw; and a die shifting motor for rotatingly driving the rotary screw.

It is also preferred that the air blowing device may include: a nozzle holder for supporting the air blowing nozzle; a plurality of guide bars for guiding a movable plate; a movable nut provided on an upper part of the movable plate; a vertical rotary screw for screwing engagement with the movable nut to cause the movable plate to move up and down; and an air blowing device driving motor for rotatingly driving the vertical rotary screw to cause the blowing nozzle to move up and down.

It is also preferred that each of the motors for driving the compacting device, parison drawing device, parison cutting device, die shifting device and the air blowing device may be an A.C. servomotor.

According to the method and apparatus of the invention for forming a hollow article, shifting and compacting of the die are effected by electric motors and the parison placed in the die is cut by the operation of a parison cutting motor. Then, air is blown into the parison through an air blowing nozzle which is driven vertically into and out of the parison by means of an electric motor, thus forming the desired hollow article within the die. More specifically, a cylindrical parison downwardly extruded from the extruder via the crosshead and suspended from the crosshead is held in the die which is operated to open and close by the compacting device actuated by the compacting motor. In this state, the crosshead is raised to draw the parison and the parison thus drawn is cut at its upper portion by means of the parison cutting device which is actuated by the parison cutting motor. The die holding the cut parison is then shifted from the position right below the crosshead to the position right below the air blowing device by the die shifting device actuated by the die shifting motor. Then, the air blowing nozzle is downwardly moved into the parison by the air blowing device driving motor and air is blown into the parison through the nozzle so as to inflate the parison into contact with the inner wall surface of the die. The die is then cooled to solidify the parison, whereby the hollow article is obtained within the die.

Thus, all the operations of the forming apparatus are effected by electric motors (servomotors), thereby eliminating contamination which hitherto occurred in conventional apparatuses using hydraulic actuators, thus ensuring production of articles with a high degree of cleanness.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the apparatus of the present invention for forming a hollow article will be described with reference to the accompanying drawings, in particular FIGS. 3 to 22.

Figure 1:
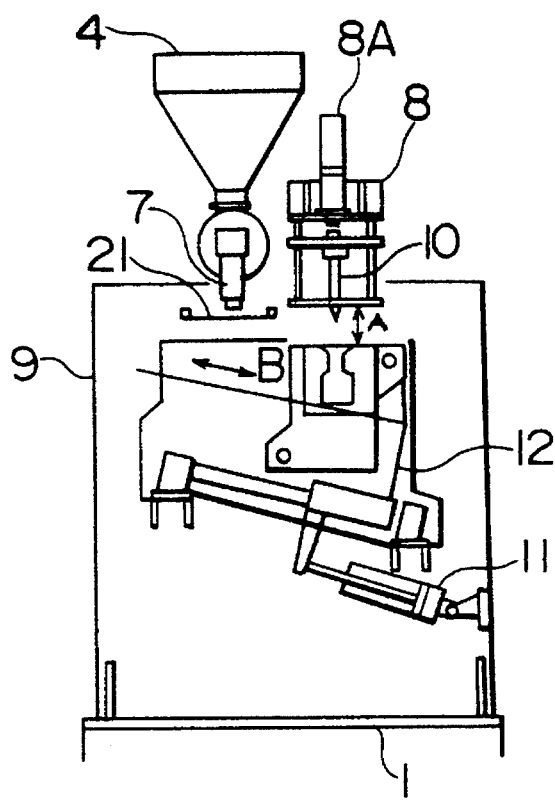
FIG. 1 is an illustration of a conventional forming apparatus.
Figure 2:
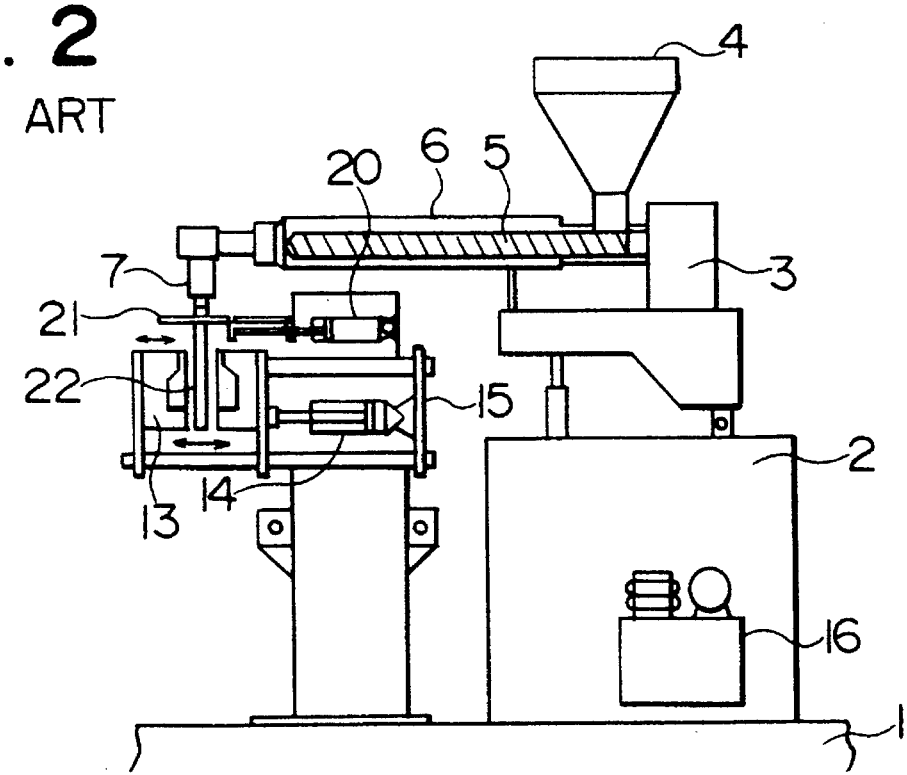
FIG. 2 is an illustration of another known forming apparatus.

In the drawings showing preferred embodiments, the same reference numerals are used to denote the parts or components which are the same as those used in the known apparatuses shown in FIGS. 1 and 2.

Figure 3:
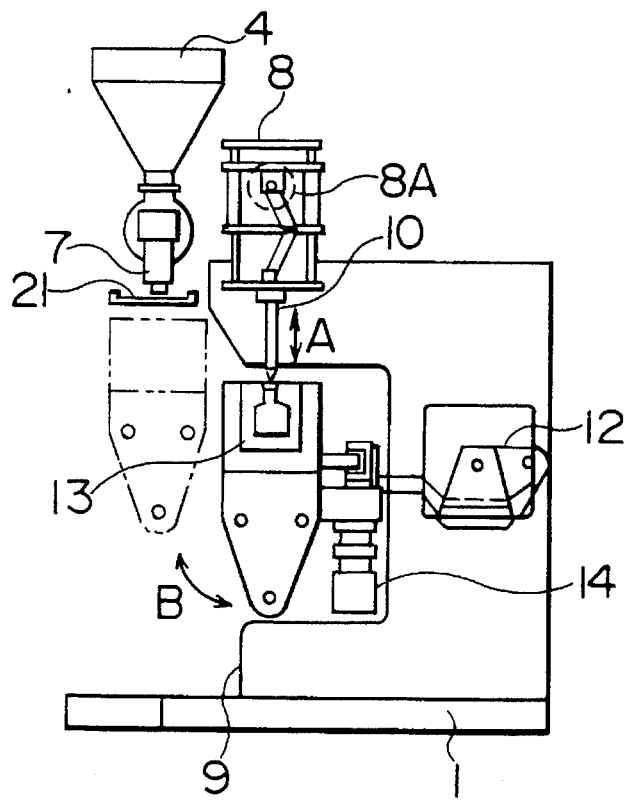
FIG. 3 is a front elevational view of an apparatus in accordance with the present invention for forming a hollow article.
Figure 4:
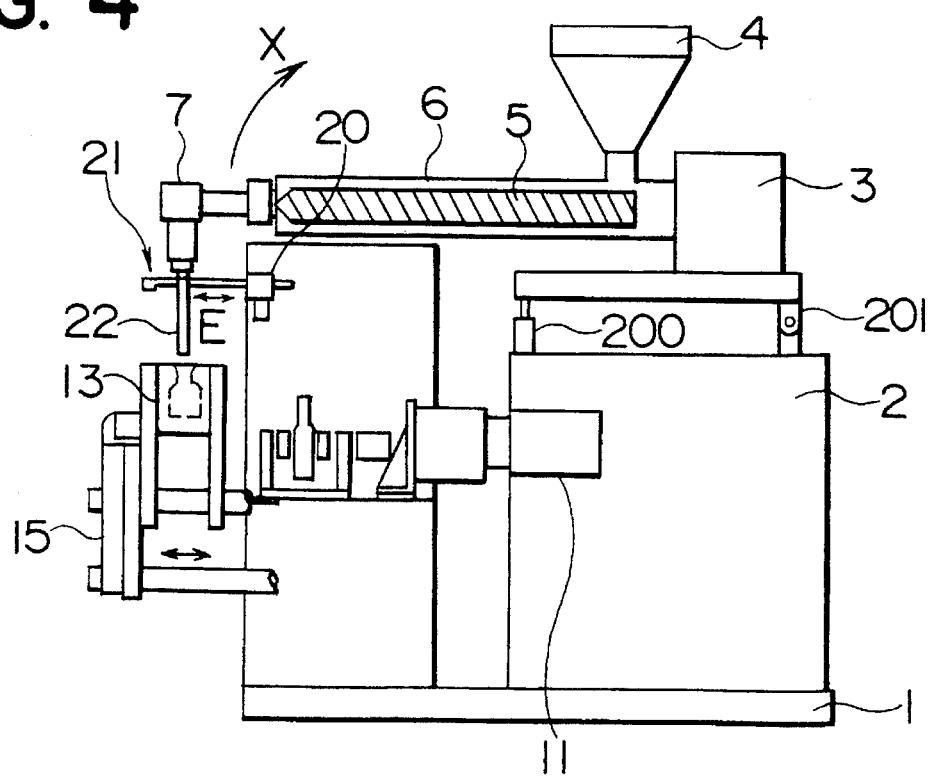
FIG. 4 is a side elevational view of the apparatus shown in FIG. 3.

Referring to FIGS. 3 and 4, a bed 1 carries a base 2 which in turn mounts an extruder 3. The extruder 3 has a hopper 4, a cylinder 6 receiving a screw 5, and a crosshead 7. An air blowing device 8, which is fixed to a frame 9 on the bed 1, is disposed adjacent to the extruder 3. The extruder 3 is rotatably and tiltably supported at a joint portion 201 by means of an electric jack 200 which acts between the extruder 3 and the base 2. Although not shown, the arrangement may be such that a plurality of electric jacks 200 are used to lift and lower the extruder 3 while keeping the latter in the horizontal posture.

The air blowing nozzle 10 provided in the air blowing device 8 is adapted to be moved up and down in the direction of the arrow A by the operation of an air blowing device driving motor 8A. A die 13 to be disposed under the crosshead 7 and the air blowing device 8 is adapted to be moved in the direction of an arrow B by the operation of a die shifting motor 11. The die 13 is adapted to be opened and closed by the operation of a die compacting device 15 which is actuated by a die compacting motor 14.

The construction of the die compacting device will be described with reference to FIGS. 5 to 7. The die is composed of a first die part 13a and a second die part 13b. A load cell 30 for measuring the compacting force applied to the die 13 is provided on the first die part 13a. To the load cell 30 is connected a later-mentioned second arm 32B of a second-stage toggle 32 which is operatively associated with a first-stage toggle 31 which in turn is connected to a die compacting motor 14 through a speed reducer 14a annexed to the motor 14.

The first-stage toggle 31 and the second-stage toggle 32 have first and second arms 31A, 31B; 32A, 32B arranged in pairs. The first and second arms of each pair are connected through a joint 31C or 32C such that both arms form a straight line or are inclined relative to each other to form a flexed line. The first arm 31A of the first toggle 31 is directly connected to the speed reducer 14a of the compacting motor 14. The toggles 31 and 32 are therefore straightened or flexed in accordance with the operation of the die compacting motor 14. Thus, the first-stage and second-stage toggles 31, 32 in cooperation form a toggle mechanism 40 which is known per se.

The first arm 32A of the second-stage toggle 32 is connected to a rear plate 41 through a second joint 38. The rear plate 41 is connected through a first-stage rod 42 and a second-stage rod 43 to a front plate 44 which is connected to the second die part 13b. The first die part 13a is movably provided on the first-stage rod 42. The plates 41, 44 and rods 42, 43 in cooperation form a die opening/closing mechanism 50 for bringing both die parts towards and away from each other so as to open and close the die 13.

Figure 5:
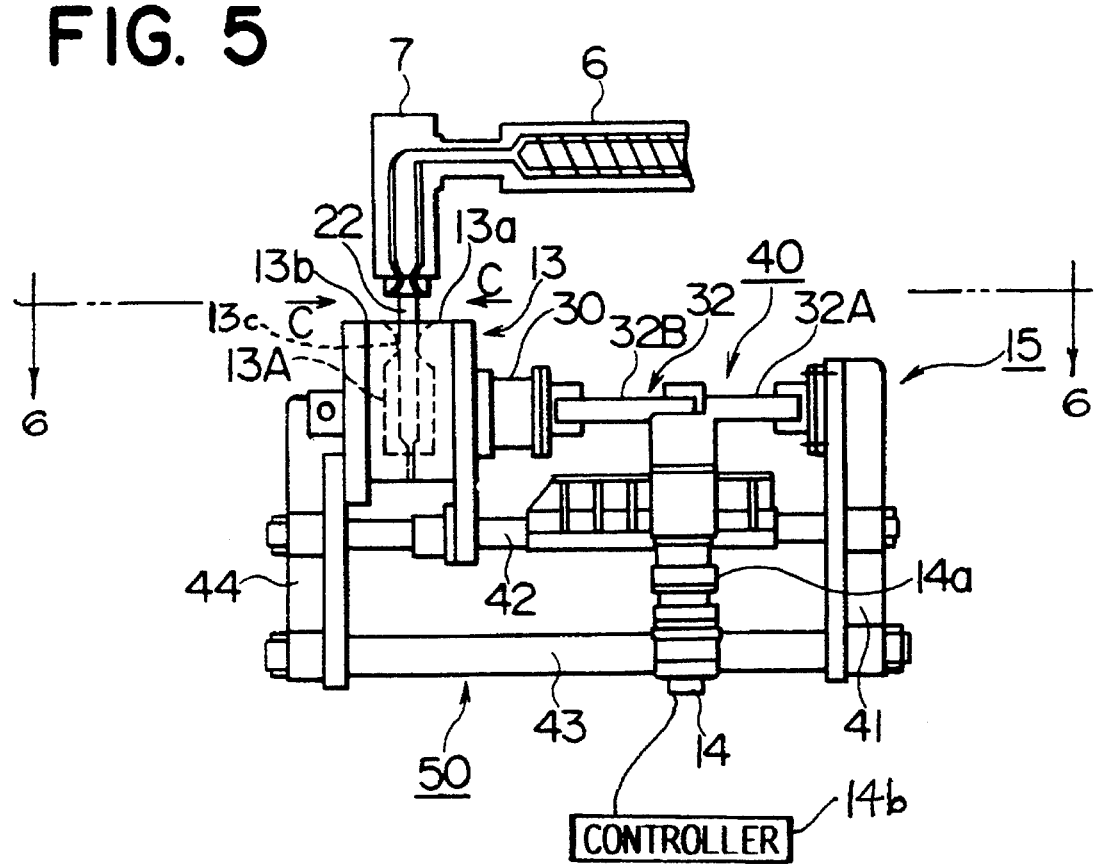
FIG. 5 is an illustration of a die compacting device incorporated in the apparatus shown in FIG. 3.
Figure 6:
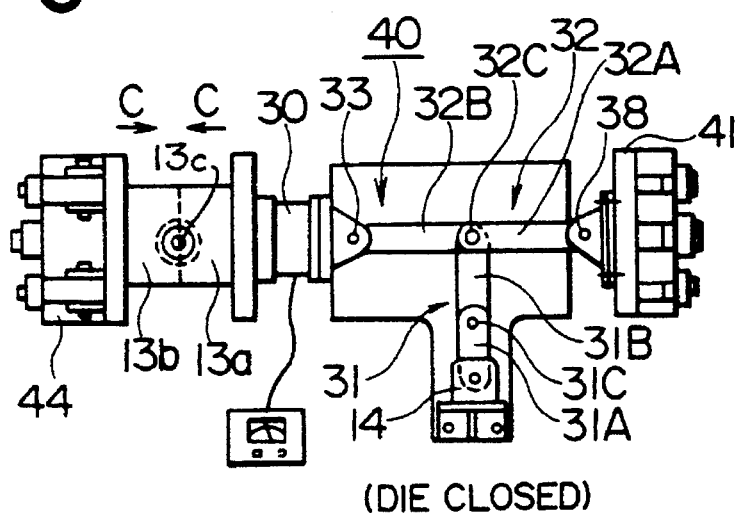
FIG. 6 is a top plan view of the apparatus as seen from line 6—6 in FIG. 5 as it appears when the die has been closed.
Figure 7:
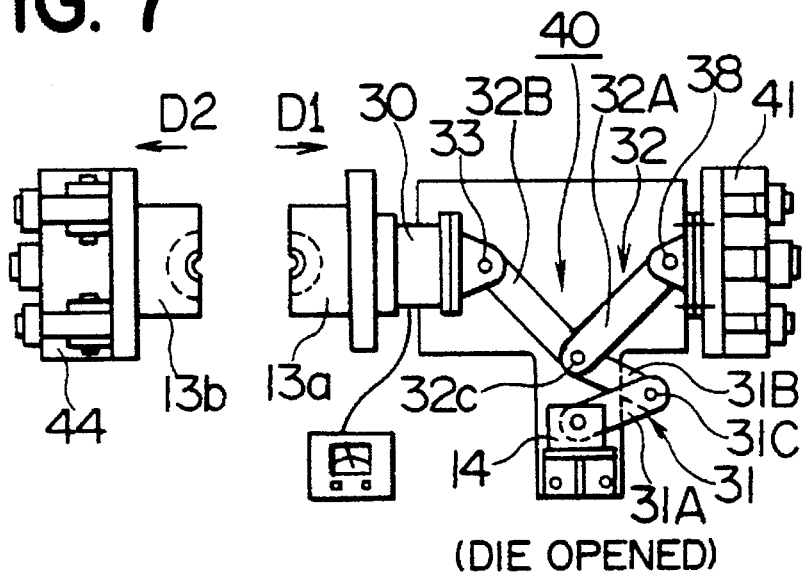
FIG. 7 is a top plan view similar to FIG. 6 but showing the apparatus as it appears when the die has been opened.

Therefore, when the toggles 31, 32 are straightened by the operation of the die compacting motor 1 4, both die parts 13a and 13b are moved towards each other as indicated by arrows C so as to close the die 13 as shown in FIGS. 5 and 6 thereby enabling the die 13 to hold a parison 22 supplied into the die cavity 13A defined in the die 13. The parison 22 remains suspended from the crosshead 7, the top aperture 13c of the die 13 surrounding the suspended parison when the die-halves 13a, 13b are closed therearound. The compacting force thus applied to the die 13 is measured by means of the load cell 30.

Conversely, when the die compacting motor 14 operates so as to flex both toggles 31, 32, the first die part 13a is moved in the direction of the arrow D1 as it is pulled by the second arm 32B of the second-stage toggle 32. At the same time, the rear plate 41 is moved by the first arm 32A to the left as viewed in FIG. 7. As a consequence, the front plate 44 and the second die part 13b are moved in the direction of the arrow D2 through the action of the rods 42, 43, (FIG. 5) whereby the die 13 is open as shown in FIG. 7. The arrangement may be such that the die compacting motor 14 is controlled by a controller 14a in accordance with a program so that the die parts 13a, 13b are operated at desired velocities and stopped at any desired positions so as to provide desired die opening, thus ensuring safe operation without error. Such a programmed control also makes it possible to store data concerning the die opening/closing speeds to provide a high degree of reproducibility of die operation which is required according to the type of the material of the hollow article to be formed.

Figure 8:
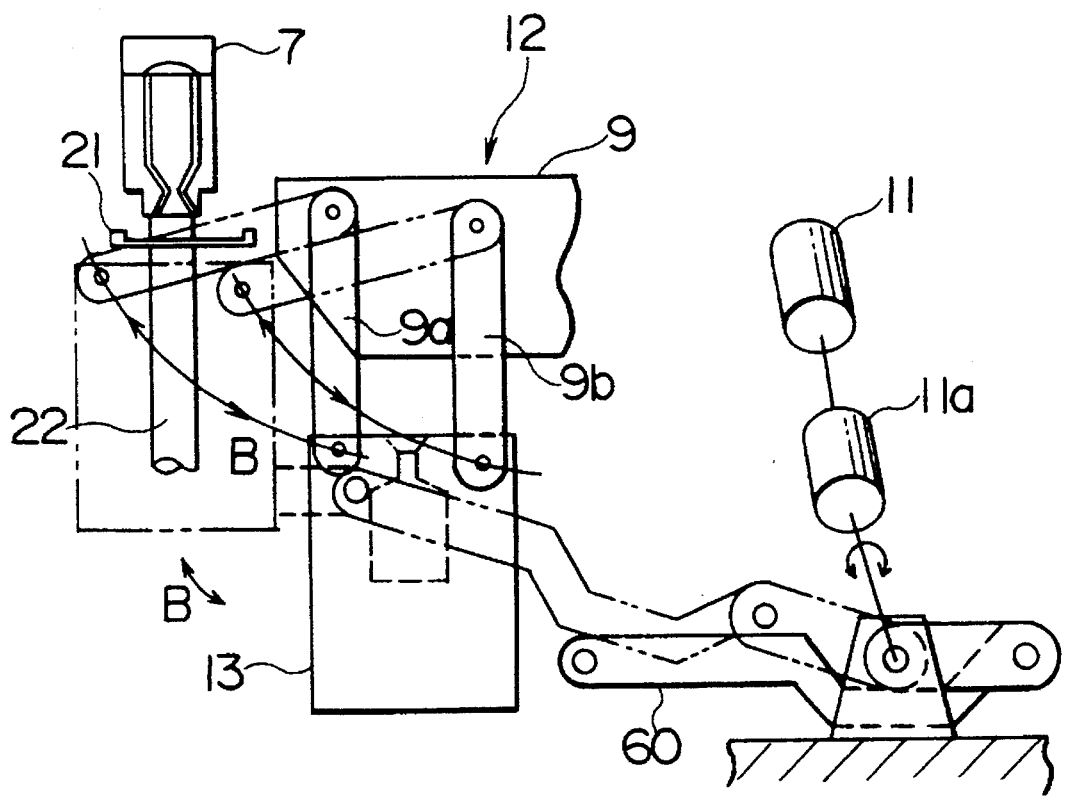
FIG. 8 is a fragmentary illustration of the apparatus showing the manner in which the die is shifted.

The die 13 is adapted to be reciprocally shifted in the directions of arrow B by the operation of a die shifting device 12 which is actuated by a die shifting motor 11 through a speed reducer 11a as shown in FIG. 8. A crank 60 is provided between the die 13 and the speed reducer 11a. A pair of arms 9a, 9b are connected between the die 13 and the frame 9 to act as a pantograph therebetween.

The arrangement is therefore such that operation of the die shifting motor 11 causes the die 13 to reciprocally moved between a position immediately under the crosshead 7 and a position immediately under the air blowing nozzle 10 (FIG. 3) of the air blowing device 8.

Figure 9:
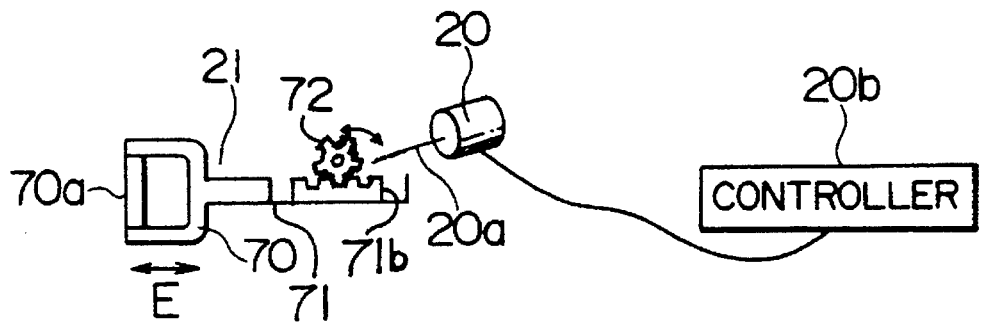
FIG. 9 is a schematic illustration of a parison cutting device.

The construction of the parison cutting device will be described with specific reference to FIGS. 9 to 11. Referring first to FIG. 9, an electric-heater cutter 70a is held by a cutter holder 70 to which is connected a follower member 77 which includes a rack 71b. The rack 71b of the follower member 71 engages with a pinion 72 which is provided on the output shaft 20a of a parison cutting motor 20 which is a variable-speed motor such as a stepper motor or a brushless rotation control motor. The pinion 72 serves as a driving member which drives the follower member 71.

A controller unit 20b having a memory (not shown) is connected to the parison cutting motor 20. The memory stores a program following the conditions of operation to be performed by the motor 20. Thus, the motor 20 is controlled in accordance with the stored program. Thus, the speed of the forward stroking of the electric-heater type cutter 70 and the speed of backward stroking of the same are independently set and controlled by means of the control unit 20b which controls the operation of the parison cutting motor 20. The electric-heater type cutter 70a is provided with electrically heated cutting edges both at the front and rear sides thereof so that it can cut the parison 22 in a single stroke, i.e., either in the forward stroking or in the backward stroking.

Figure 10:
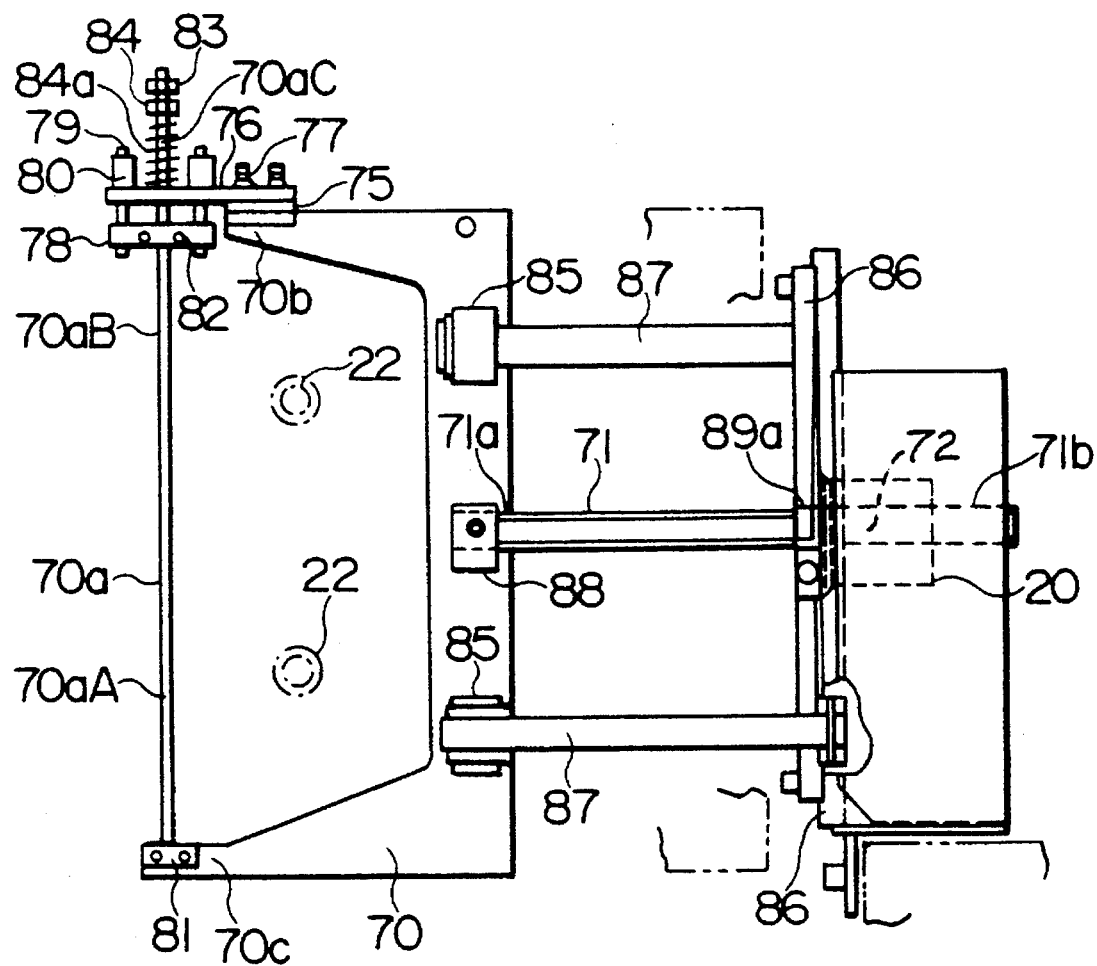
FIG. 10 is an enlarged plan view of the parison cutting device of FIG. 9 showing details of the construction thereof.
Figure 11:
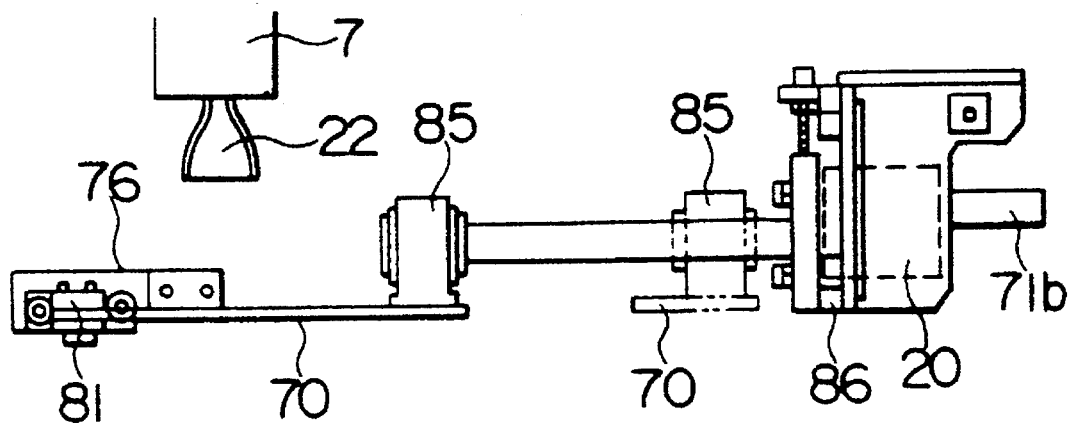
FIG. 11 is a side elevational view of the parison cutting device showing the details of the construction thereof.

As shown in FIGS. 10 and 11, a guide plate 76 is detachably secured to one end 70b of the cutter holder 70 by means of bolts 77, through the intermediary of an insulating plate 75. A cutter mounting plate 78 is movably secured to the guide plate 76 through guide bars 79 which engage with fixed bushings 80.

The electric-heater type cutter 70a is fixed at its one end 70aA to the other end 70c of the cutter holder 70 through a mounting pate 81. The other end 70aB of the electric-heater type cutter 70a is fastened to the cutter mounting plate 78 by means of set screws 82. The other end 70aB of the electric-heater type cutter 70a has an extension 70aC which movably extends through a hole in the guide plate 76 so as to project externally therefrom.

A pair of nuts 83, 84 are screwed on to the outer end of the extension 70aC, and a spring 84a is wound around the portion of the extension 70aC between the guide plate 76 and the springs 83, 84. It is therefore possible to control and adjust the tension on the electric-heater type cutter 70a by suitably adjusting the nuts 83, 84.

A pair of annular linear bushings 85 provided on the cutter holder 70 slidably receive a pair of shafts 87 on a stationary part 86 which is spaced apart from the cutter holder 70. One end 71a of the follower member 71 is fixed through a pressing plate 88 to a portion of the cutter holder 70 between the pair of linear bushings 85.

The other end 71b of the follower member 71 slidably extends through an aperture 89a of the stationary part 86 and engages with a pinion 72 provided on the shaft of the aforesaid motor 20 mounted on the stationary part 86. The arrangement is such that the follower member 77 and the cutter holder 70 move in accordance with the operation of the motor 20.

The electric-heater type cutter 70a is supplied with electrical power from a power supply which is not shown.

A description will now be given of the operation of the parison cutting device 21 having the described construction.

As seen in FIG. 5, a cylindrical parison 22, which is downwardly extruded through the crosshead 7 of the extruder 3, is held at a position immediately under the crosshead 7 by means of the die 13 which is adapted to be opened and closed by the die compacting device 15 actuated by the die compacting motor 14. While the parison 22 is held in the die 13, the crosshead 7 is raised by pivoting the extruder 3 in the direction X (FIG. 4) about joint 201 by operating the jack 200 to draw the parison 22. Thereafter, the parison cutting motor 20 is operated under the control of the controller 20b so that the cutter holder 70 and, hence, the electric-heater type cutter 70a are advanced through the action of the pinion 72 and the follower member 77, so as to cut the parison 22 (see FIG. 10) at an upper portion thereof above the die 13. Then, as seen in FIG. 3, the die 13 holding the cut parison 22 is shifted in direction B from the position directly under the crosshead 7 to a position directly under the air blowing device 8 by the operation of the die shifting device 12 which is actuated by the die shifting motor 11 so as to reciprocally shift the die 13 between these two positions. Then, the air blowing device driving motor 8A, which is capable of moving the air blowing nozzle 10 up and down as shown by arrows A in FIG. 3, is operated to insert the air blowing nozzle 10 into the parison 22. Air is blown into the parison 22 through the air blowing nozzle 10, so that the parison 22 is inflated in the die 13 into close contact with the die inner surface. The die 13 is then cooled to solidify the material of the parison 22, whereby the hollow article is formed as the product.

Preferably, data concerning the conditions of operation of the motor 20 is stored in the memory (not shown) of the controller 20b so as to optimize the shape of the cut edge of the parison for a variety of parison materials and for different conditions such as the temperature of the material, diameter of the hollow article to be formed, and so forth. According to such an arrangement, the motor 20 can be program-controlled to optimumly achieve the cutting of the parison 22 regardless of variation in the conditions such as the material, temperature and so forth. Consequently, cutting of the parison can be effected automatically even by those who do not have any experience or skill, simply by pressing a switch (not shown) for triggering the cutting operation.

In the described embodiment, the follower member and the driving member are respectively constituted by a rack 71 and a pinion 72. This, however, is not exclusive and it will be clear to those skilled in the art that any suitable combination of other types of driving and driven members, such as a belt and a roller, may be used equally well.

Figure 12:
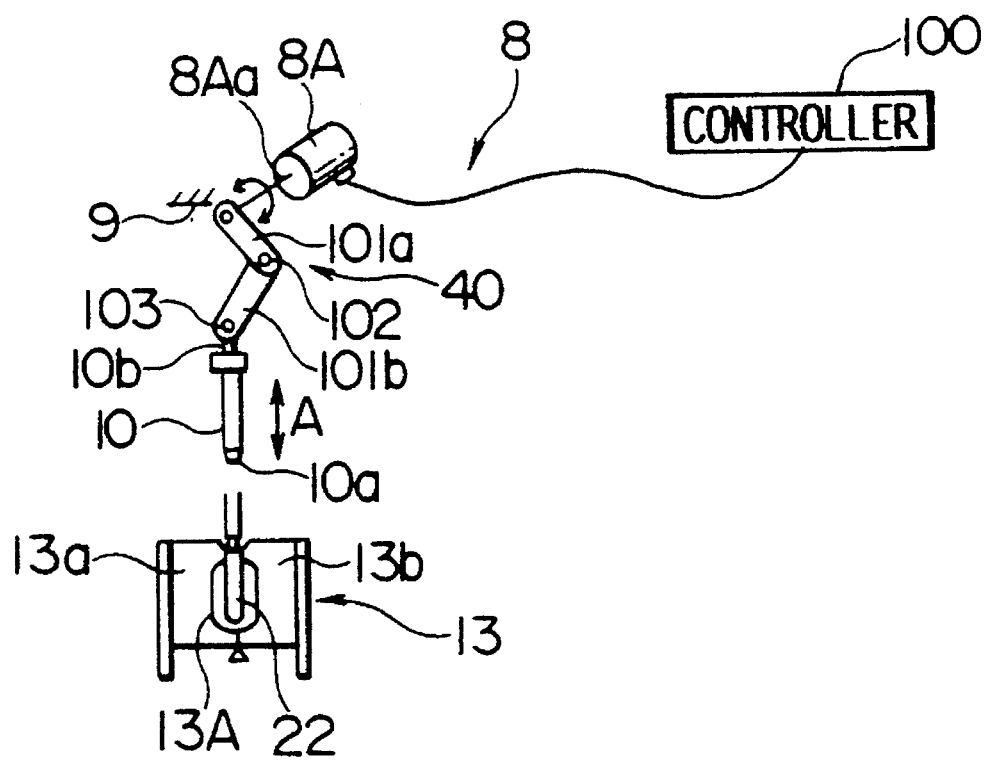
FIG. 12 is a schematic illustration of an air blowing device incorporated in the apparatus shown in FIG. 3.

The construction of the air blowing device 8 will be described with reference to FIGS. 12 and 13. Referring to FIG. 12, the air blowing device driving motor 8A of the variable-speed type is carried by a frame 9 and is connected to a controller 100. The motor 8A has a shaft 8Aa which is connected to a first operating member 101a of a toggle mechanism 40 which is flexible at its intermediate portion.

The first operating member 101a is connected to a second operating member 101b through a first joint 102. The first and second operating members 101a, 101b are thus pivotally connected to each other so as to be inclinable with respect to each other, thus forming the aforesaid toggle mechanism 40 which also has a speed reducing function.

The second operating member 101b is connected through a second joint 103 to a connecting portion 10b of the air blowing nozzle 10. The arrangement is such that the air blowing nozzle 10 is moved up and down as indicated by arrow A by the action of the toggle mechanism 40. The air blowing nozzle 10 is adapted to be supplied with compressed air from a compressed air source which is not shown. Obviously, the toggle mechanism 40 may be substituted by a suitable feeding mechanism having a speed reducing function, such as, for example, a rack-and-pinion type mechanism.

The aforementioned die 13, composed of a pair of die parts 13a, 13b movable into and out of contact with each other, is disposed beneath the air blowing nozzle 10. A cylindrical parison 22 extruded from the extruder is placed in the die cavity 13A defined by these two die parts 13a, 13b.

Details of the constructions of the motor 8A, toggle mechanism 40 and the air-blowing nozzle 10 will be described with reference to FIG. 13.

An auxiliary stationary part 110A is integrally connected to the underside of the stationary part 110 through a plurality of cylindrical brackets 111. Guide bars 112 are vertically movably received in the cylindrical brackets 111. A guide plate 113 and a holder plate 114 are fixed to both ends of the guide bars 112 by means of nuts 115.

The aforementioned air blowing nozzle 10 is suspended from the underside 114a of the holder plate 114. The toggle mechanism 40 described before is disposed between the upper side 114b of the holder plate 114 and the lower side 110a of the stationary part 110 so as to act therebetween. The shaft 8Aa of the motor 8A is connected to the first operation member 101a of the toggle mechanism 40.

The first operation member 101a is pivotally secured to a first anchor portion 116 provided on the underside 110a of the stationary part 110 through the rotary shaft 8Aa, while the second operation member 101b is pivotally secured through a pin 103 to a second anchor portion 118a provided on the upper side of the holder plate 114.

The motor 8A is secured to an L-shaped bracket (not shown) which is fixed both to the stationary part 110 and a side of the auxiliary stationary part 110A and operates in accordance with a program stored in a memory (not shown) of the controller 100.

The air blowing device 8 having the described construction operates as follows.

As the first step, and as previously described with reference to FIGS. 5–7, the die 13 is opened and a cylindrical parison 22 extruded from an extruder (not shown) is placed in the die cavity 73A defined in the die 13. Then, both die parts are brought together to close the die 13 and and the die 13 is moved below the air blowing device 8, as also previously described. Then the motor 8A is started so that the operation members 101a, 101b which have been a flexed state as indicated by broken lines in FIG. 13 are straightened as indicated by solid line, with the result that the holder plate 114 also is lowered together with the air blowing nozzle 10 as indicated by arrow A in FIG. 12 so that the rod 10a on the end of the nozzle 10 is introduced into the exposed upper region of the parison 22.

In this state, compressed air is supplied from the air source (not shown) into the parison 22 through the air blowing-nozzle 10, thus effecting blow forming within the die 13. After cooling of the die 13, the die parts 13A, 13B are moved apart from each other so that the formed hollow article can be taken out of the die 13.

Data concerning the pattern of change in the velocity of insertion of the air blowing nozzle 10 performed by the motor 8A is stored in the memory (not shown) of the controller 100, for each of a variety of resin materials and different configurations of the articles to be formed. The operation of the motor 8A is controlled in accordance with the program so as to freely adjust the above-mentioned speed of insertion of the air blowing nozzle. Consequently, the blowing operation can be optimumly conducted simply by pressing of a switch for triggering the operation, without relying upon the perception of the operator.

In the illustrated embodiment, the die 13 is moved by swinging motion to the position immediately under the air blowing nozzle 10 as shown in FIG. 8. This, however, is only illustrative and may be substituted by another suitable arrangement such as that shown in FIG. 14. More specifically, in FIG. 14, the die 13 is carried by a movable base 210 which in turn is horizontally movably mounted on the base 2 by means of a plurality of guide bars 212. The movable base 210 has a connecting member 213 which is connected to a nut 216 screwed on a rotary screw 215 which is rotatably held by the base 2 through a bracket 214. The rotary screw 215 is driven by the die shifting motor 11 having an encoder 11a, so that the die 3 is horizontally moved precisely between the solid-line position and the broken-line position in accordance with the operation of the die shifting motor 11.

Figure 15:
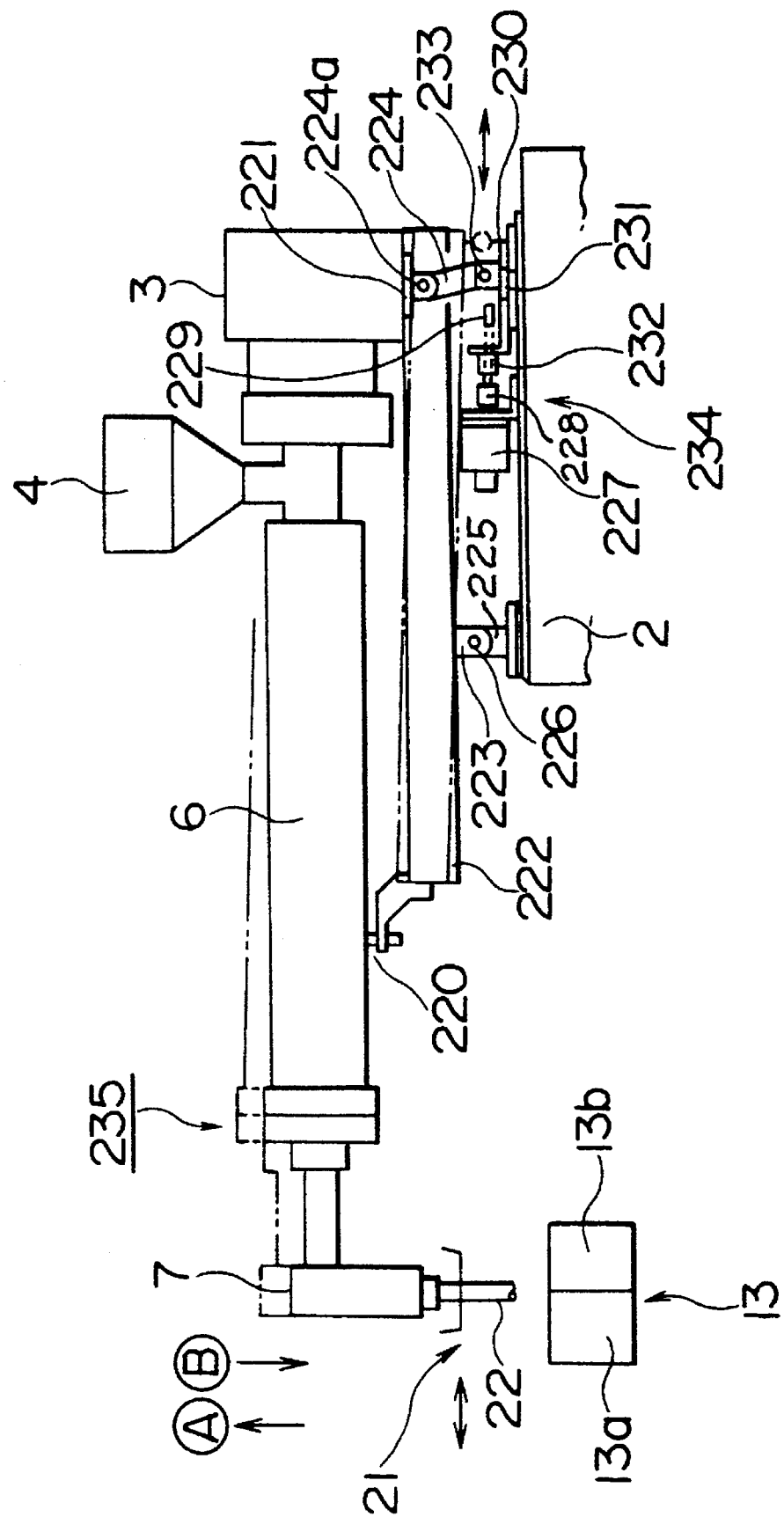
FIG. 15 is an illustration of a different embodiment of the parison cutting/drawing device.

In the previously described embodiment, the crosshead 7 of the extruder 3 is swung upward as illustrated in FIG. 4. This arrangement is only illustrative and another suitable arrangement such as that shown in FIG. 15 can be used to provide the same effect as that produced by the arrangement shown in FIG. 4. In FIG. 15, the parts or components which are the same as those in FIG. 4 are denoted by the same reference numerals as those used in FIG. 4.

More specifically, referring to FIG. 15, the crosshead 7 is connected to the extruder 3 so as to be moved up and down as indicated by arrows A and B. The die 13, which is composed of first and second die parts 13a and 13b movable into and out of contact with each other, is disposed under the crosshead 7. A parison cutting device 21 for cutting the cylindrical parison 22 suspended from the crosshead 7 also is disposed under the crosshead 7.

The extruder 3 is mounted on a swing base 222 through a first supporting portion 220 and a second supporting portion 221. A supporting member 223 and a link 224 are provided on the swing base 222 through a link connecting portion 224a. The supporting member 223 is rockably mounted on a support member 225 of the base 2, through a pivot portion 226 which functions as a fulcrum.

The base 2 carries a parison drawing motor 227 which is an A.C. servomotor. A rotary screw 229, which is connected to the motor 227 through a coupling 228, is screwed on to a nut 232 on a moving member 231 which is movable along the rails 230. The moving member 231 has a link holder 233 which is connected to the link connecting portion 224a through the above-mentioned link 224. Thus, the nut 232 and the link holder 233 are operably connected through the moving member 231.

The position of the fulcrum constituted by the above-mentioned pivot portion 226 is determined such that the weight of the swing base 222 carrying the extruder 3 is balanced at this position.

The motor 227, rotary screw 229, nut 232, link holder 23 and the link 224 in cooperation form a swing base tilting portion 234. Thus, the swing base tilting portion 234, cylinder 6 and the crosshead 7 in cooperation form a parison drawing/cutting device 235. In operation of the parison cutting/drawing device 235, the parison 22 suspended from the crosshead 7 is clamped by the die 13 and is continuously drawn upward at a velocity which is 1.0 to 1.1 times as high the parison discharging velocity, thereby cutting the parison 22. After the swinging of the parison 22 to the upper limit position, the crosshead 7 is gently lowered to the original position within the operation cycle while imparting vibration to the parison 22 so as to avoid generation of ring marks. It is possible to suitably determine and set the velocities of the upward and downward movement of the crosshead 7, by virtue of the use of the electric actuator.

In the described arrangement, the die 13 is first opened to receive the parison 22 suspended from the crosshead 7 and is then closed to hold the parison 22 in the die cavity (not shown) formed therein. In this state, the swing base 222 is held in the horizontal posture as shown by solid line. Then, the parison drawing motor 227 is started to extend the moving member 231, so that the rear end of the swing base 222 is lowered. Thus, the swing base 222 is tilted as indicated by broken lines to move the crosshead 7 upward as indicated by arrow A. As a result of this movement of the crosshead 7, the parison 22 is drawn in the vertical direction.

The parison 22 thus drawn is cut by the parison cutting device 21 such that the cut end of the parison is located at a level slightly above the top end of the die 13, whereby a severed parison is left in the die 13. The operation of the parison drawing motor 227 is so controlled that the velocity of the upward movement of the crosshead 7 is comparatively high in the beginning period of the operation but is reduced gradually so that the parison 22 is slightly drawn without any slack, taking into account the velocity at which the parison 22 is lowered and the velocity of movement of the parison cutting device 21. The velocity of the downward movement of the crosshead 7 is so determined that the crosshead 7 is reset to the original position with minimized shock within one cycle of the parison drawing/cutting operation.

According to the described construction and operation, the parison 22 is cut while it is drawn in the vertical direction, so that a horizontal cut edge is obtained to provide a substantially completely cylindrical trumpet-like form of the cut parison 22.

The resetting of the crosshead 7 to the original position is conducted by reversing the parison drawing motor 227. Namely, the reversing of the parison drawing motor 227 causes the link holder 233 to move towards the parison drawing motor 227 so that the tilted swing base 222 resumes its horizontal posture to return the crosshead 7 to the original lower position.

Figure 16:
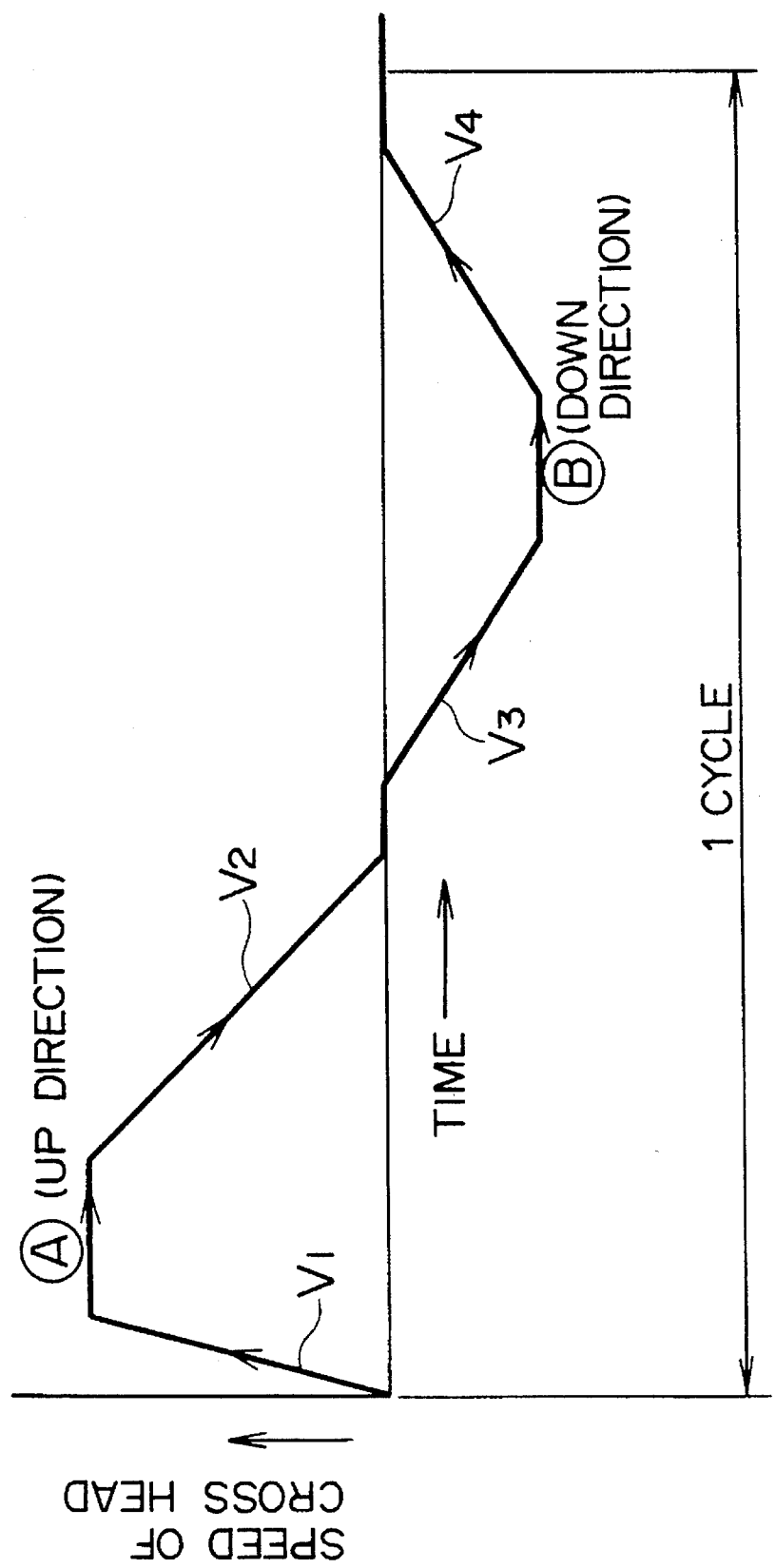
FIG. 16 is an illustration of the operation of the crosshead shown in FIG. 15.

FIG. 16 illustrates the patterns in which the velocity of the crosshead 7 is changed during upward and downward stroking. As will be seen from this Figure, the initial velocity V1 in the upward stroking (arrow A in FIG. 15) is set to a large value, which said velocity is selected so that the parison 22 is slightly drawn without slack, i.e. said velocity is set to enable a slight draw of a parison 22, taking into consideration the velocity at which the parison 22 is lowered and the velocity of movement of the parson cutting device 21. The velocity is then reduced as denoted by final velocity V2 to the final velocity which is low enough to minimize any mechanical shock.

As to the downward stroking (arrow B in FIG. 15) of the crosshead 7, the initial velocity V3 and the final velocity V4 are set to low levels to minimize the mechanical shock.

Figure 17:
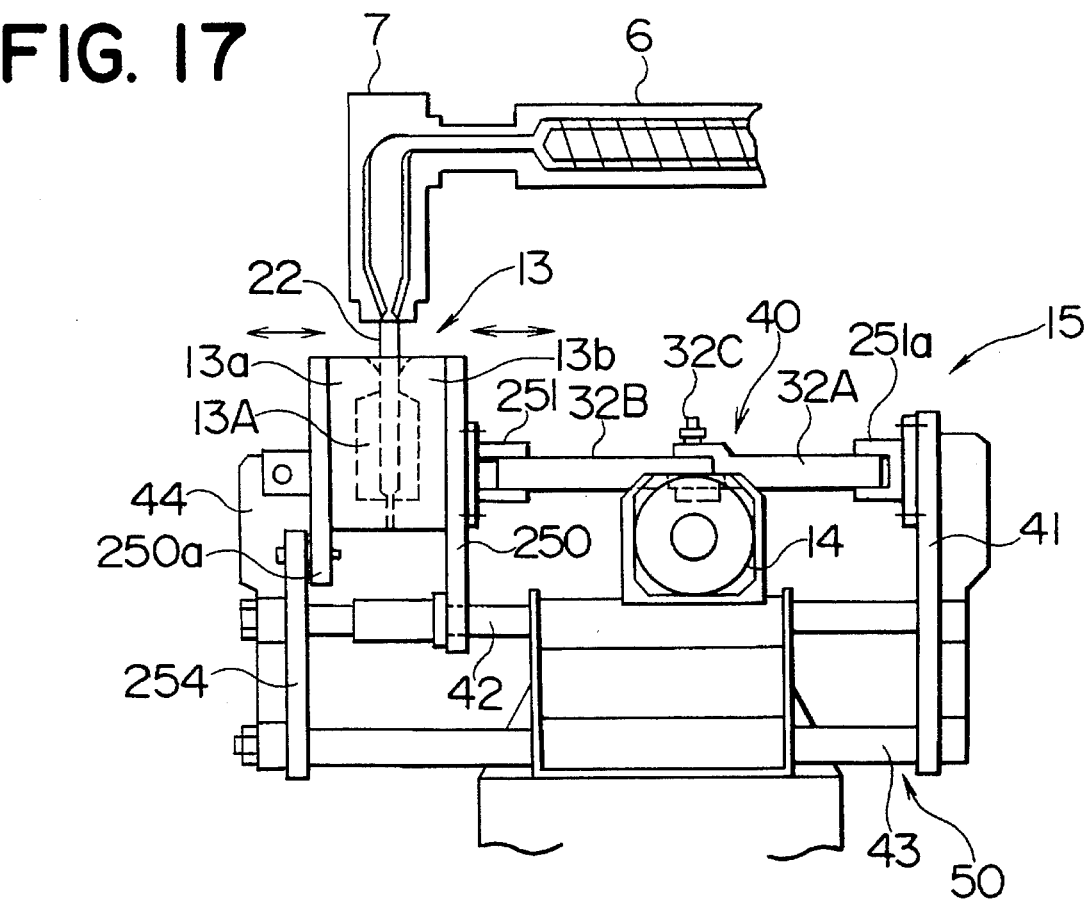
FIG. 17 is an illustration of a different embodiment of the die compacting device.
Figure 18:
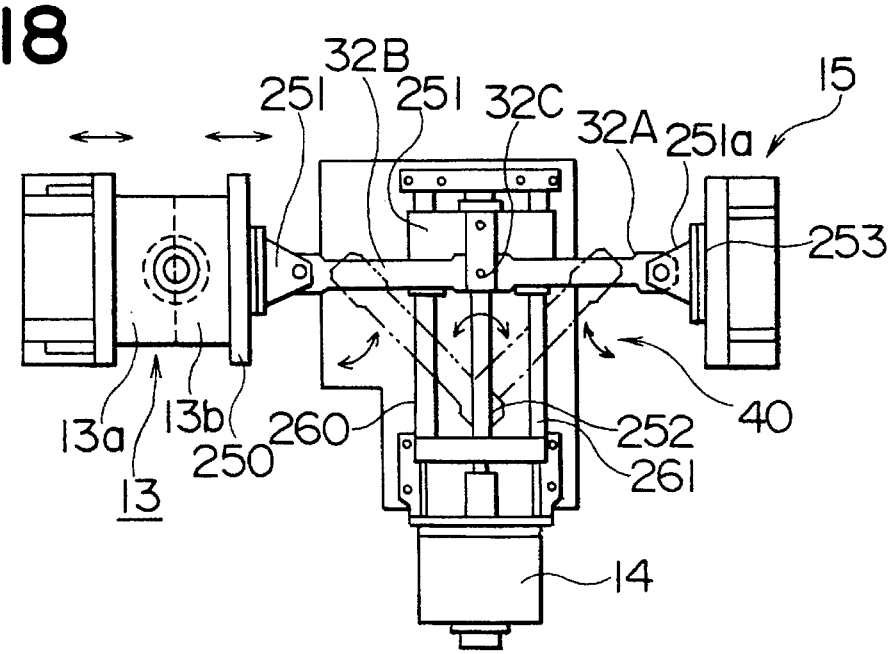
FIG. 18 is a plan view of the die compacting device of FIG. 17 showing the construction of a critical portion thereof.

The construction of the die compacting device 15 shown in FIGS. 3 to 7 is only illustrative. Thus, a construction as shown in FIGS. 17 and 18 may be used in place of the construction illustrated in FIGS. 3 to 7. In FIGS. 17 and 18, the same reference numerals as those in FIGS. 3 to 7 are used to denote the same parts or components as those in FIGS. 3 to 7.

More specifically, FIGS. 17 and 18 illustrate a compacting device of a blow forming apparatus of the present invention, wherein FIG. 17 is a front elevational view of the apparatus showing the construction thereof, while FIG. 18 is a plan view illustrative of the operation of the apparatus.

Referring to FIGS. 17 and 18, a die 13 is composed of a first die part 13a and a second die part 13b which are movable into and out of contact with each other to open and close the die 13. The arrangement is such that a parison 22 suspended from a crosshead 7 of an extruder 6 is held in a die cavity 13A defined between both die parts 13a and 13b when the die 13 is closed.

The second die part 13b is connected, through a second die part holder 250 and a first crevice member 257, to a toggle mechanism 40 having first and second toggle members 32A and 32B which are flexibly connected to each other through a joint 32C. A guide block 251, which holds the joint 32C between the toggle members 32A, 32B, is guided by a pair of centering guide bars 260, 261.

The guide block 251 is adapted to be reciprocally moved in the axial direction by a feed screw 252 such as a rotary ball screw driven by a die compacting motor 14. The first die part 13a is held by a first die part holder 250a.

A pair of rods 42 and 43 are connected to a rear plate 253 which is connected to the second toggle member 32B through a second crevice member 251a. The rods 42 and 43 are fixed to a connecting member 254 which in turn is connected to the first die part holder 250a mentioned before. The rod 42 movably extends through a hole formed in the first die part holder 250. The rear plate 253, rods 42, 43 and the connecting member 254 in cooperation form a die opening/closing mechanism 50 for opening and closing the die 13.

In operation, the die compacting motor 14 is started to move the guide block 251 through the operation of the feed screw 252, so that the toggle members 32A and 32B are straightened or flexed with respect to each other as shown by broken line and solid line in FIG. 18. When the toggle members 32A and 32B are straightened along a straight line, the die part holders 250 and 250a are moved towards each other by the operation of the die part opening/closing mechanism 50. Consequently, the die parts 13a and 13b are brought together to close the die 13. Conversely, when the toggle members 32A, 32B are flexed with respect to each other, the die parts 13a and 13b are moved apart from each other to open the die 13.

Figure 19:
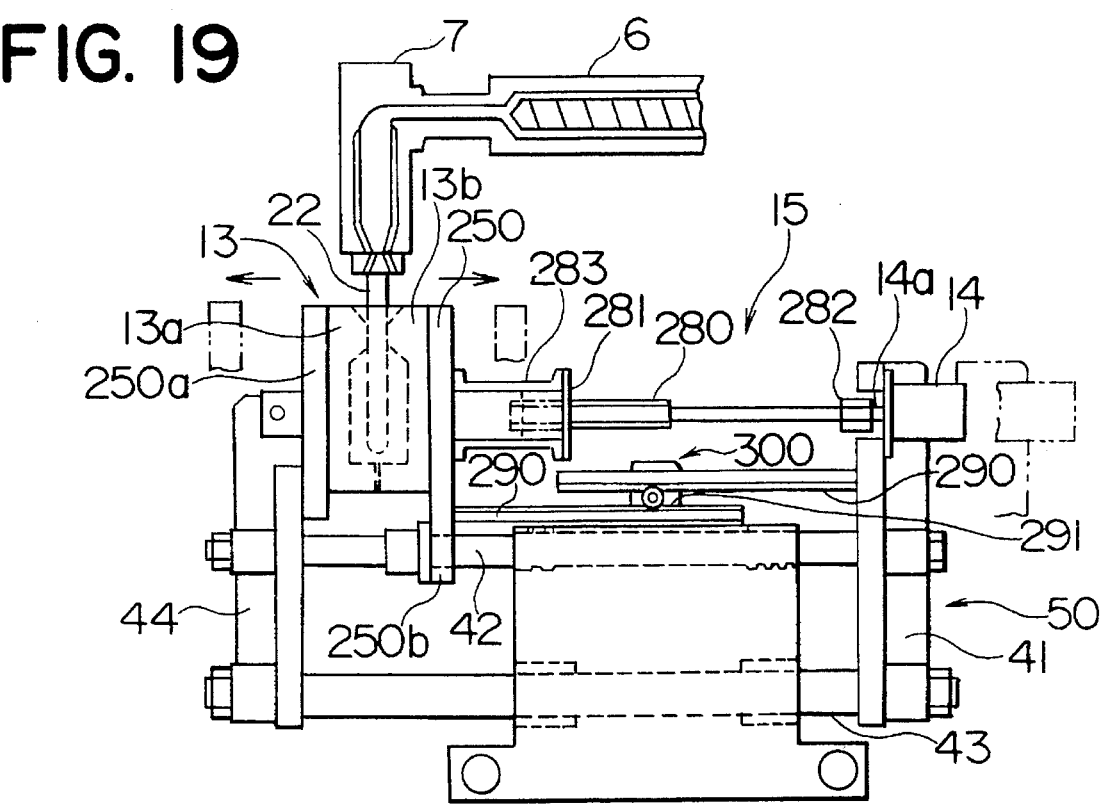
FIG. 19 is an illustration of another embodiment of the die compacting device.

The die compacting device 15 shown in FIGS. 17 and 18 also is illustrative and may be substituted by, for example, an arrangement shown in FIG. 19.

In FIG. 19, the same reference numerals are used to denote the same parts or components as those appearing in FIGS. 17 and 18.

Referring to FIG. 19, a crosshead 7 is connected to an extruder 6. A first die part 13a and a second die part 13b are disposed under the crosshead 7 so as to be movable into and out of contact with each other. The first die part 13a is secured to a first die part mounting plate 250a of a front plate 44, while the second die part 13b is secured to a second die part mounting plate 250 which is connected to a rear plate 41 by means of a rotary screw 280 and a nut 284. The first and second die parts 13a and 13b in combination form a die 13.

The front plate 44 and the rear plate 41 are connected to each other through a plurality of tie bars 42, 43. The tie bar 42 movably extends through a through hole 250b formed in the second die part mounting plate 250.

The rotary screw 280 is connected through a coupling 282 to the rotary shaft 14a of a die compacting motor 44 on the rear plate 41. The above-mentioned nut 284 is secured to a second die part mounting plate 250 through a support 283. The rotary screw 280 is screwed on to the nut 281. It is thus possible to open and close the die 13 by the operation of the die compacting motor 14. The die part mounting plates 250, 250a, nut 281, compacting motor 14, plates 44, 41 and the tie bars 42, 43 in cooperation form a die compacting device 15. The second die part mounting plate 250 and the rear plate 41 are connected to each other through a synchronizing portion 300 which is composed of racks 290, 290 and a pinion 291.

In operation, the resin extruded from the extruder cylinder 6 is introduced to the crosshead 7 to form a cylindrical or tubular parison 22 directed downward. The parison 22 is introduced into the space between the die parts 13a, 13b of the die 13 which have been stationed under the crosshead 7. When the cylindrical parison 22 is formed to a predetermined length, the die compacting motor 14 is started to drive the rotary screw 280, so that the die parts 13a and 13b are moved in the die closing directions through the action of the plates 44, 41 and the tie bars 42, 43, thus conducting die closing and compacting operations. In this state, the parison 22 is cut by a cutter which is not shown, and the die 13 is shifted to a position adjacent to an air nozzle (not shown). The nozzle then blows air into the parison 22, so that the parison 22 in the die 13 is inflated, thus accomplishing blow forming of a hollow article. The die 13 is then cooled and the die parts 13a and 13b are moved apart from each other to allow the formed article to be taken out of the die.

Figure 20:
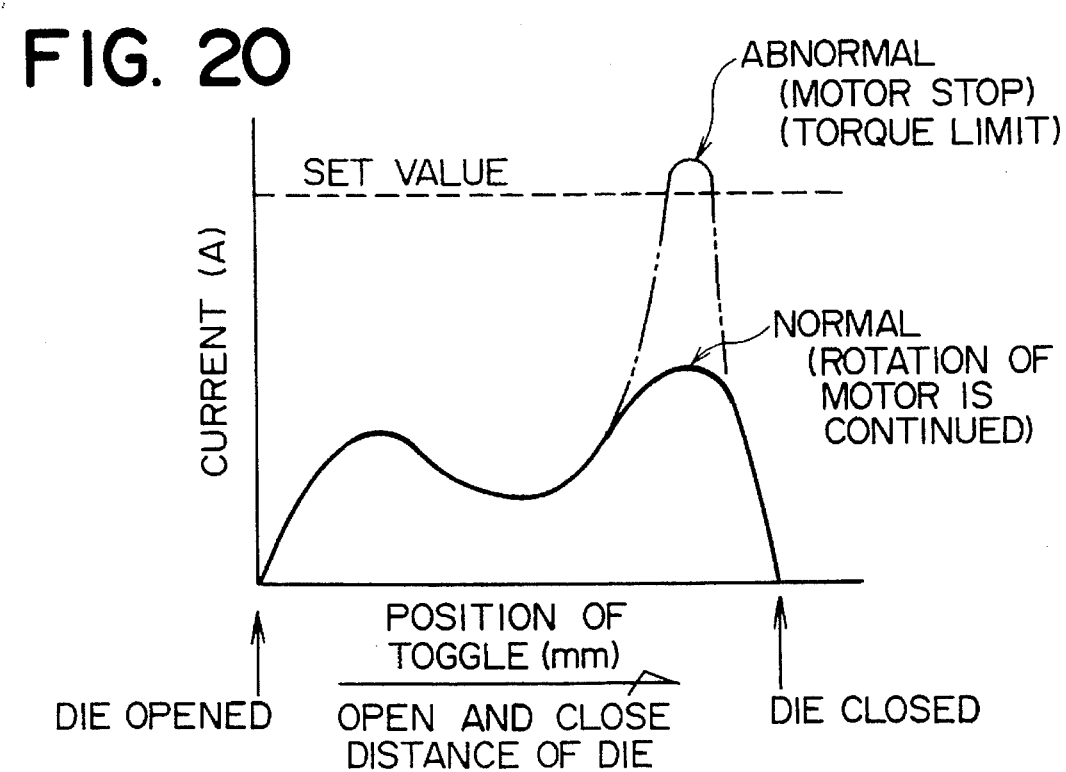
FIG. 20 is a diagram showing control characteristics of a die compacting motor.

The die closing and compacting operations performed by the die compacting motor 14 and the toggle mechanism 40 which are of any of the types shown in FIGS. 3 to 19 may be conducted while monitoring the current in the compacting motor 14 which is an A.C. servomotor by means of a current sensor (not shown). The detected level of the current is compared with a set value as shown in FIG. 20 and, when the detected current exceeds the set value, the output torque of the compacting motor 14 is limited or the motor 14 is stopped, thus ensuring safety in the die closing and compacting operations.

Figure 13:
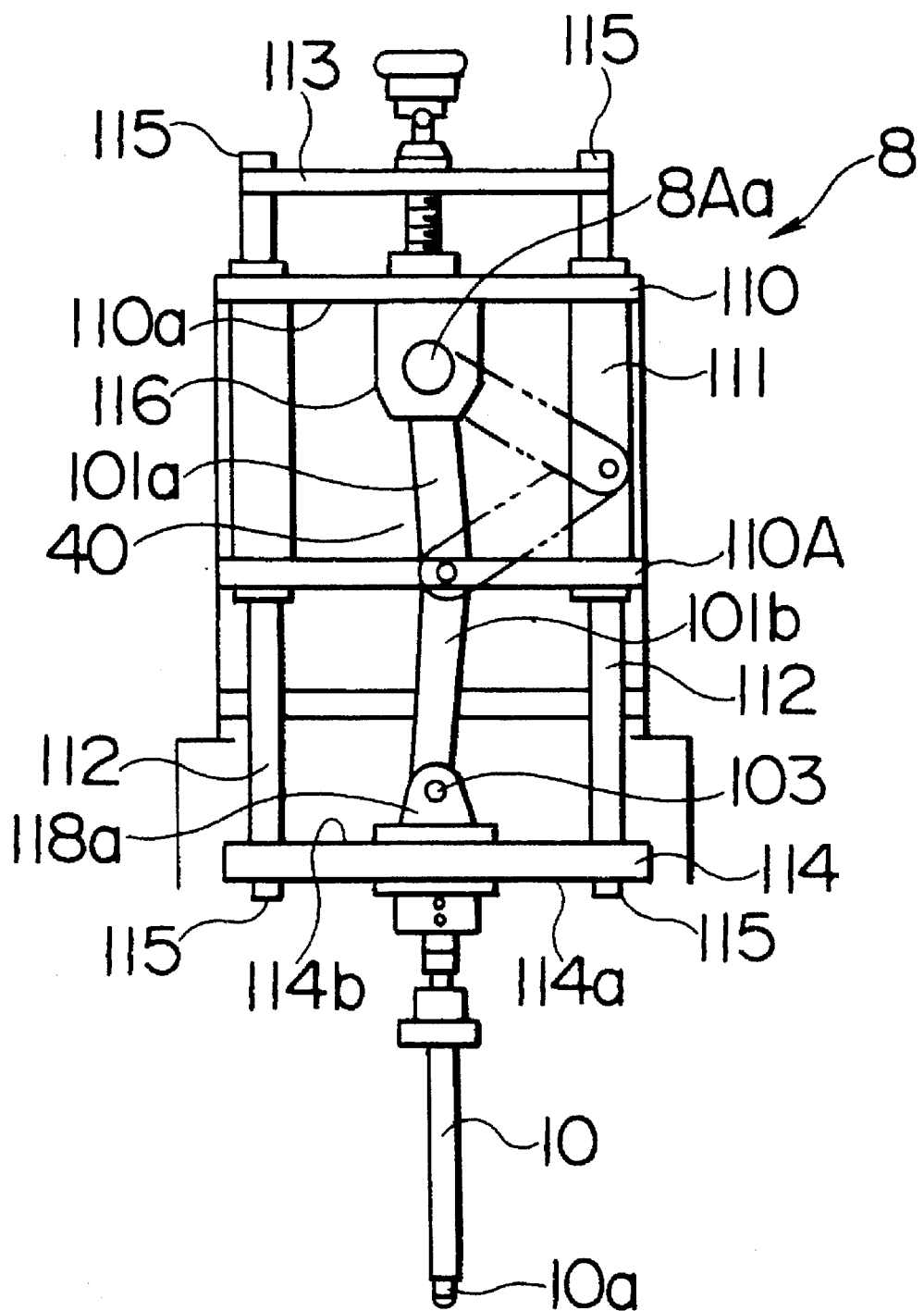
FIG. 13 is an illustration of the details of the air blowing device.
Figure 14:
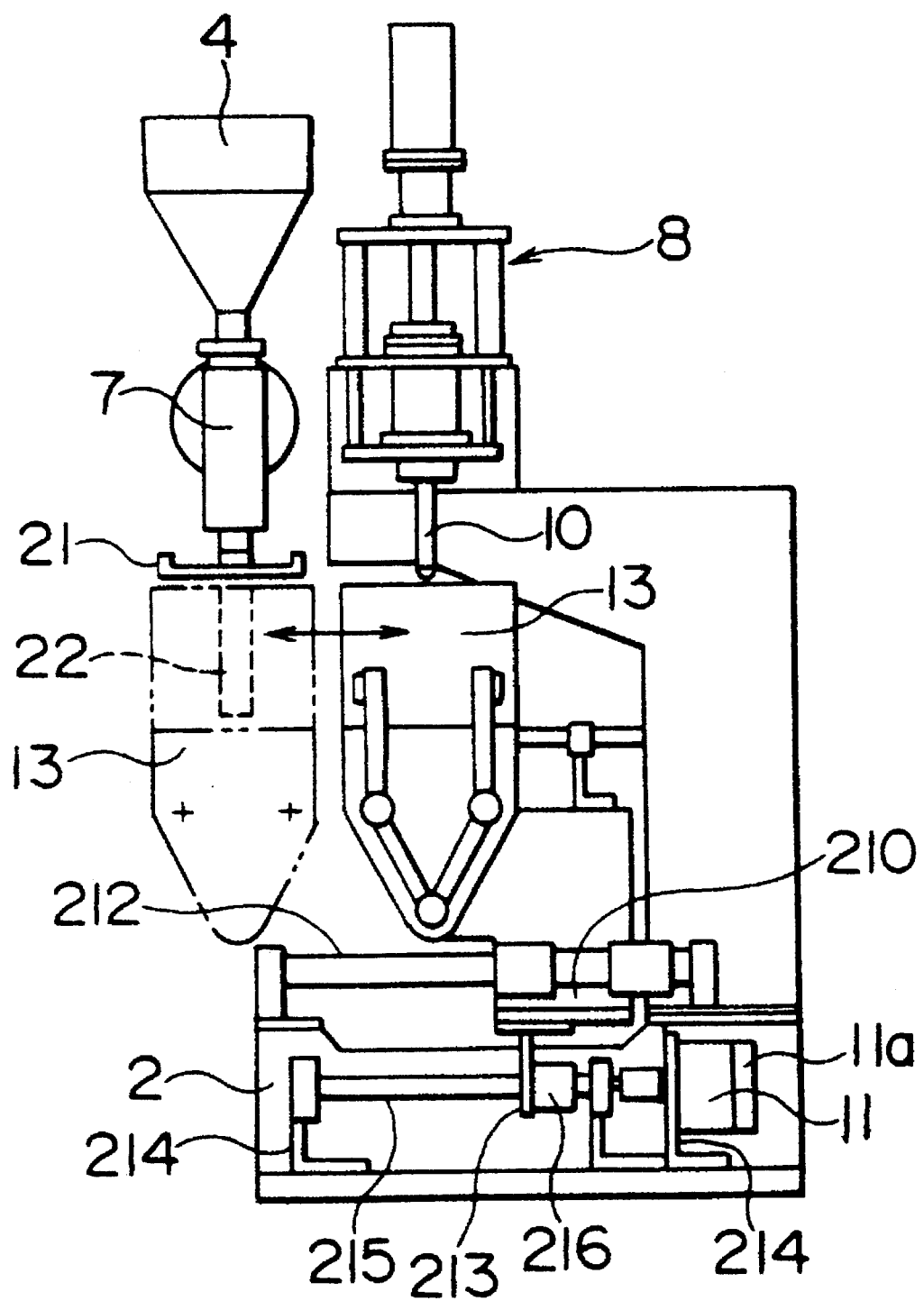
FIG. 14 is an illustration of a different embodiment of the die shifting device.
Figure 21:
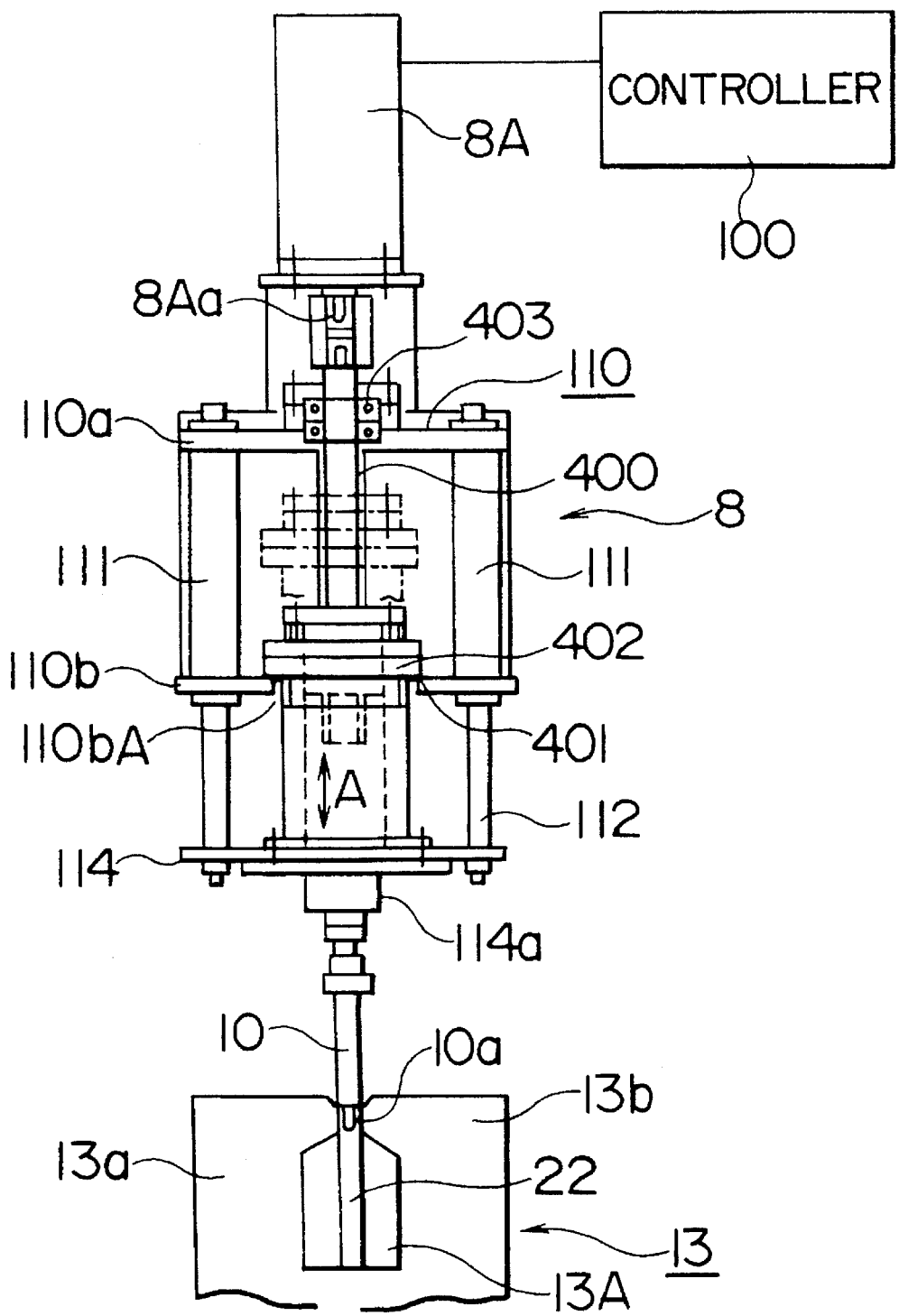
FIG. 21 is an illustration of the construction of a different embodiment of the air blowing device.
Figure 22:
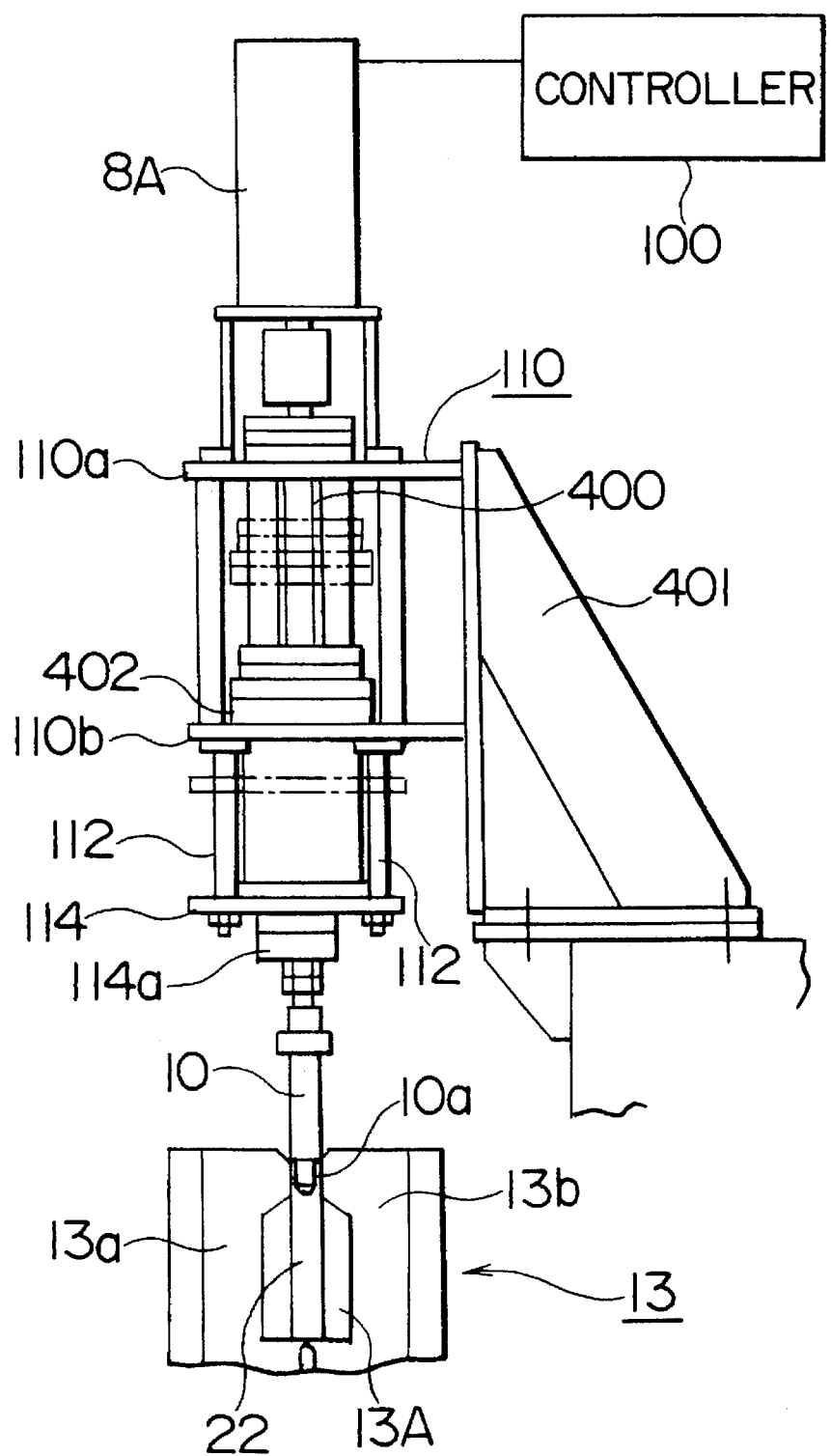
FIG. 22 is an illustration of a structure for mounting the air blowing device shown in FIG. 21.

The construction of the air blowing device 8 shown in FIG. 13 is not exclusive and may be substituted by a mechanism which employs a rotary screw 400 as shown in FIGS. 27 and 22. Such a substitutive mechanism will be described with reference to FIGS. 21 and 22.

In these Figures, the same reference numerals are used to denote the same parts or components as those appearing in FIG. 13.

More specifically, FIG. 21 is a front elevational view, while FIG. 22 is a side elevational view, of an air blowing device used in the apparatus of the present invention for forming a hollow article.

Referring to these Figures, a reference numeral 110 denotes a stationary part which is composed a pair of plates 110a and 110b which are fixed to a base 401. A plurality of guide sleeves 111 provided on the stationary part 110 receive corresponding guide bars 112 for vertical movement therein. A movable plate 114 having a blowing nozzle holder 114a is integrally attached to the lower end of the guide bar 112.

The blowing nozzle holder 114a is provided at its lower portion with an air blowing nozzle 10. A die 13 composed of a pair of die parts 13a and 13b is disposed under the blowing nozzle 10. The arrangement is such that air is blown into a parison 22 inside the die 13 through the blowing nozzle 10.

A movable nut 402 having a stopper 402 is integrally provided on an upper part of the movable plate 114 so as to movably extend through a hole 110bA formed in the plate 110b. The stopper 402 has a diameter greater than that of the hole 110bA.

An air blowing device driving motor 8A is provided on the plate 110a. The air blowing device driving motor 8A has an output shaft 8Aa to which is connected a vertical rotary screw 400 such as a ball screw through a thrust bearing 403. The vertical rotary screw 400 is screwed into the nut 402 so as to extend therethrough. Thus, the arrangement is such that the movable plate 114 is moved up and down as indicated by arrow A through the movement of the movable nut 402 in accordance with the rotation of the rotary screw 400.

The described air blowing device operates as follows.

The die 13 is opened and a tubular or cylindrical parison 22 extruded from an extruder (not shown) is placed in the die cavity 13A of the die 13. After the die 13 is closed, the air blowing device driving motor 8A is started so that the air blowing nozzle 10 is lowered to bring its lower end 10a the upper end portion of the parison 22 by the actions of the rotary screw 400, movable nut 402 and the movable plate thus completing the insertion of the nozzle 10. The air blowing device driving motor 8A may be so controlled that the end 10a of the nozzle 10 is pressed into the upper surface of the die 13 with a predetermined level of contact pressure.

In this state, compressed air is introduced from an air source (not shown) into the parison 22 so that a blow forming process takes place in the die 13. The die 13 is then opened to allow the formed hollow article to be taken out of the die 13.

Data, concerning the pattern of change in the velocity of movement of the air blowing nozzle effected by the air blowing device driving motor 8A are beforehand formed for a variety of conditions such as the configurations of the articles to be formed, types of resins used and so forth, and are stored in a memory (not shown) of controller 100. In operation, the speed of operation of the air blowing device blowing motor 8A is controlled and varied in accordance with the data read from the memory. It is therefore possible to optimize the conditions of insertion of the air blowing nozzle 10 into the parison held by the die, simply by operating a switch for triggering the operation, without relying upon manual control which necessitates perception of the operator.

By virtue of the features described hereinbefore, the forming method and apparatus of the invention for forming a hollow article offers the following advantages.

Firstly, it is to be noted that the product articles can be formed with a high degree of cleanness, without any risk of contamination by oil which hitherto has been inevitable due to the use of hydraulic actuators.

It is also to be noted that the speed of operations such as opening and closing of the die, shift of the die and so forth can be freely controlled. At the same time, a high degree of precision of the stop position is attained to enable blow forming to be carried out under optimum conditions for individual types of articles, thus reducing the rate of production of unacceptable products.

Velocities of movement of parts such as movement of the die parts, shifting of the die and up and down movement of the air blowing nozzle can be controlled with a high degree of reproducibility by virtue of the storage of the velocity pattern data, so that the blow forming of a hollow article can be carried out without requiring any perception of the operator or high degree of skill and experience.

It is also to be pointed out that about a 20 to 30 percent reduction in energy consumption is achieved as compared with conventional apparatuses which employ hydraulic actuators.

Furthermore, the level of noise can be greatly reduced partly because the electric motors used in the invention are not required to operate continuously in contrast to hydraulic motors used in the conventional apparatuses and partly because the source of noise such as from a hydraulic pump is not used.

The use of electric actuators also facilitates trouble shooting, as well as group management.

Furthermore, since insertion of the air blowing nozzle into the parison is performed by the motor which is controlled in accordance with stored velocity pattern data, the conditions for the insertion of the air blowing nozzle are optimized for the configuration and material of each type of parison, in contrast to the conventional method in which the operation is manually controlled with the perception of the operator.

The precision of insertion of the air blowing nozzle into the parison also is enhanced because the velocities of upward and downward movements of the air blowing nozzle can be delicately controlled by virtue of the use of the electric motor.

The time required for lowering the air blowing nozzle into the parison also is shortened to prevent any draw-down of the parison.

The present invention can be carried out even by those who are not familiar with the operation of the apparatus, once the conditions of a successful test production is stored. With such stored data, it is possible to shorten the time for the preparation and to reduce production of unacceptable articles in the beginning period of the production, thus remarkably contributing to improvement in the yield.

In the embodiment in which the air blowing nozzle is moved up and down by the operation of a rotary screw, it is possible to set the length of the air blowing nozzle to a desired value within the stroke of the rotary screw and to easily set the lowered position by means of the stopper. On the other hand, the upward movement of the air blowing nozzle is limited by the stroke end. It is thus possible to reduce the time required for the engagement of the air blowing nozzle.

In the apparatus of the present invention, the air blowing nozzle is directly pressed towards the die. It is therefore possible to monitor and control the contact pressure in terms of the torque of the electric motor for driving the air blowing nozzle. This also contributes to improvement in the yield.

The velocities of the die parts for opening and closing the die, as well as the positions where these die parts are stopped, can be freely and delicately controlled by virtue of the programmed control of the electric motor. In particular, the precision of stop positions can be enhanced and undesirable movement of the die parts after the stopping due to disturbance can be avoided to improve safety.

The die compacting motor can be kept out of operation when no die opening nor closing operation is required, thus offering saving of energy as compared with the conventional apparatuses which employ hydraulic actuators.

The compacting force also can be changed as desired by suitably controlling the torque of the compacting motor. Thus, the level of the compacting force can be optimized for the size of the article to be formed, thus protecting the die against any damage and extending the life of service of the die. At the same time, the die compacting force can be displayed to improve the operability of the apparatus.

Various operation conditions such as the compacting force, velocities of movements of the die parts for opening and closing the die, stop positions of the die parts and so forth can be realized with a high degree of reproducibility, thus shortening the time required for preparation and facilitating management of the product quality, compensating for any insufficiency in the operator's skill and experience.

The use of the electric motor as the compacting power source makes it possible to precisely control the compacting force regardless of any variation in the size of the die.

Furthermore, the adaptability of the apparatus is increased because the velocities of movements of the die parts are easily controlled during die opening and closing operations.

The compacting force also can be electrically sensed by the load cell.

The opening and closing of the die can be effected with a high degree of reproducibility when the data concerning these operations is stored.

In the embodiment in which the die is opened and closed through the cooperation between the toggle mechanism and the feed screw, the die opening and closing operations can be smoothly conducted with the aid of the guide block. This makes it possible to employ an electric motor of a reduced size, thus contributing to saving of space.

The smoothed die opening and closing operations also afford a remarkable improvement in the yield of production of hollow articles.

In the conventional apparatuses of the type which employ a pneumatically driven cutter for cutting a parison in its leftward and rightward stroking, it is impossible to adjust the velocities at which the cutter is moved from the left to the right and vice versa. In contrast, according to the present invention which an employs electrically driven cutter, the velocities of cutting movements of the cutter from the left to the right and vice versa can be optimumly changed and set in accordance with the conditions such as the shape and thickness of the parison, whereby good configuration of the cut edge of the parison can be constantly obtained regardless of the direction of the cutting movement of the cutter.

In the apparatus of the present invention employing electric motors as the actuators, the parison is drawn when it is cut by upward swinging of the crosshead through which the parison is discharged. It is therefore possible to cut the parison by a uni-directional movement of the cutter. For instance, the cutter is moved from the left to the right and then to the left.

It is therefore possible to cut the parison in such a manner that a cut edge of good quality is constantly obtained.

Finally, it is to be understood that the apparatus of the present invention can operate stably regardless of any change in temperature.

What is claimed is:

1. Apparatus for blow-molding a hollow article from moldable material, comprising an extruder having a crosshead for extruding said material downwardly to form a parison suspended from said crosshead;

an openable and closable die for receiving and blow-molding said parison therein to form said hollow article, said die being movable between a parison-receiving position beneath said crosshead and an article-blowing position, and said die having a top aperture for surrounding said parison received in said die when said die is closed to permit said parison to remain suspended from said extruder crosshead;

a compacting device having means driven by a first electric motor for opening and closing said die at either of its said positions;

a die shifting device having means driven by a second electric motor for moving said die from either of its said positions to the other;

a parison drawing device having means driven by a third electric motor for moving said extruder crosshead substantially vertically between a position adjacent to said die when in its said parison-receiving position with said parison received therein and suspended from said extruder crosshead and an upper position with respect to said die at said parison-receiving position to thereby draw said parison between said die and said crosshead;

a parison cutting device including a parison cutter, means for heating said cutter, and means driven by a fourth electric motor for moving said cutter, when heated, horizontally between said die and said extruder crosshead to cut said drawn parison when said crosshead is in its said upper position;

an air blowing device having a vertically movable air blowing nozzle adjacent to said article-blowing position of said die and having means driven by a fifth electric motor for moving said nozzle between a lower position thereof adjacent to said die top aperture and engaging said cut parison received in said die at said article-blowing position and a raised position thereof away from said die, and air blower means for blowing air through said nozzle when in its said lower position to blow-mold said parison in said die to form said hollow article.

2. Apparatus according to claim 1, wherein said parison cutter is reciprocally movable, and which further comprises a programmable controller controlling said fourth electric motor to independently control the respective velocities in each direction of said reciprocal movement of said cutter.

3. Apparatus according to claim 2, wherein said cutter is an electric heater cutter having a front side cutting edge and a rear side cutting edge for cutting said parison in either direction of said reciprocal movement of said cutter.

4. Apparatus according to claim 1, wherein said parison cutting device comprises a cutter holder holding said cutter, a plurality of horizontally movable shafts secured to and supporting said cutter holder, a follower member connected to said cutter holder and to said fourth electric motor for moving said cutter holder while supported by said movable shafts and thereby moving said cutter horizontally.

5. Apparatus according to claim 4, wherein said follower member is connected to said fourth electric motor by a rack on said follower and a pinion on said motor and engaging said rack.

6. Apparatus according to claim 1, wherein each of said electric motors is an A.C. servomotor.

7. Apparatus according to claim 6, wherein each of said A.C. servomotors is controlled by a controller.

8. Apparatus according to claim 1, wherein said parison drawing device comprises a support, an elongated, substantially horizontal swing base mounted for reciprocal vertical pivotal movement on said support, an extruder mounted on said swing base and carrying said extruder crosshead whereby said reciprocal vertical movement of said swing base moves said crosshead substantially vertically and alternately between its said positions, said swing base having a first end facing in direction away from said extruder crosshead and an opposite end facing towards said crosshead, a vertically pivotal connection mounting said first end of said swing base substantially on said support and a vertically moveable jack mounted on said support and engaging substantially said opposite end of said swing base, said third electric motor being connected to said jack for imparting reciprocal vertical movement thereto.

9. Apparatus according to claim 1, wherein said parison drawing device comprises a support, an elongated substantially horizontal swing base mounted for reciprocal vertical pivotal movement on said support, an extruder mounted on said swing base and carrying said extruder crosshead whereby said reciprocal vertical pivotal movement of said swing base moves said crosshead substantially vertically and alternately between its said positions, said swing base having an end facing in direction away from said extruder crosshead, said third electric motor being mounted on said support, and connection means between said third electric motor and said swing base substantially adjacent to said end thereof for providing said vertical pivotal movement of said swing base.

10. Apparatus according to claim 9, wherein said swing base has an opposite end supporting said extruder, and which further comprises a pivot connection between said support and said swing base permitting said vertical pivotal movement of said swing base on said support, said pivot connection being at a location along the length of said swing base between the first said end and said opposite end thereof.

11. Apparatus according to claim 10, wherein said location of said pivot connection is such that the weight of said swing base and said extruder thereon is balanced at said location.

12. Apparatus according to claim 1, wherein said die comprises a first die part on one side of said die and a second die part on a side of said die opposite said one side, said die parts being openable and closeable together, and said compacting device comprises a plate spaced away from said die on said opposite side thereof with said second die part in between said first die part and said plate, a tie bar extending between and secured to said first die part and said plate to provide concurrent movement thereof, and means mounting said second die part for concurrent movement with said first die part but in opposite direction, said mounting means connecting said second die part and said plate and having movable means driven by said first electric motor for alternately moving said second die part and said plate toward and away from each other, said tie bar secured to said plate concurrently moving said first die part away from said second die part when said plate and said second die part move towards each other and concurrently moving said first die part into closed relation with said second die part when said plate and said second die part move away from each other.

13. Apparatus according to claim 12, wherein said movable means comprises a first stage toggle and a second stage toggle, said first stage toggle being drivably connected to said first electric motor for alternate movement of said first stage toggle between a flexed position and an extended position thereof, and said second stage toggle being drivably connected to said first stage toggle for alternate movement of said second stage toggle between a flexed position thereof when said first toggle is in its said flexed position to thereby move said die to its said open position and an extended position thereof when said first stage toggle is in its said extended position to thereby move said die to its said closed position.

14. Apparatus according to claim 12, wherein said movable means comprises a toggle having a first arm pivotally connected to said second die part, a second arm pivotably connected to said plate, and a pivotable connection between said first and second arms, and retractable and extendable means connected to said pivot connection and to said first electric motor to move said toggle alternately between a flexed position and an extended position of its said first and second arms with respect to each other to thereby alternately move said die to its said open position and to its said closed position, respectively.

15. Apparatus according to claim 12, wherein said movable means comprises a rotary feed screw extending between and connected between said second die part and said plate to impart said alternately opposite movement thereof with respect to each other, said rotary feed screw being drivably connected to said first electric motor for alternate rotation in opposite directions to move said die alternately to its said open position and to its said closed position.

16. Apparatus according to claim 11, which further comprises a fixed frame of said apparatus adjacent to said air blowing device, and said means of said die shifting device comprises a pair of parallel arms having opposite ends, one end of each of said arms being pivotally mounted on said frame in spaced, side-by-side relation to each other, and the other end of each of said arms being pivotally connected to said die in equally spaced, side-by-side relation whereby said arms are arranged for pantographic movement of said die between its said parison-receiving article-blowing positions.

17. Apparatus according to claim 1, which further comprises a fixed base of said apparatus having laterally extending guides, a movable base mounted for lateral movement on said guides, said die being secured to said movable base for movement therewith between its said parison-receiving and article-blowing positions, said fixed base further having a laterally extending rotatable screw mounted thereon in driving engagement with said second electric motor for alternately opposite rotation, a nut engaging said rotatable screw for movement therealong responsive to said rotation thereof, and means attaching said nut to said movable base whereby said rotation of said rotatable screw moves said movable base along said guides.

18. Apparatus according to claim 1, which further comprises a fixed frame of said apparatus adjacent to said article-blowing position of said die, and said means of said air blowing device comprises a vertical sleeve having attachment means attached to said frame, a guide bar mounted within said sleeve for vertical movement therein and having means carrying said air blowing nozzle for imparting said vertical movement thereto, and a toggle comprising a pair of pivotally connected, substantially vertically extending upper and lower arms, said lower arm having a lower end pivotally connected to said means carrying said nozzle and said upper arm having an upper end pivotally connected to said attachment means of said sleeve, said fifth electric motor drivably engaging said pivotal connection of said toggle upper arm for alternately opposite pivotal movement of said upper arm to alternately extend and flex said toggle to move said nozzle vertically and alternately between its said lower and raised positions.

19. Apparatus according to claim 1, which further comprises a fixed frame of said apparatus adjacent to said article-blowing position of said die, and said means of said air blowing device comprises a vertical sleeve attached to said frame, a guide bar mounted within said sleeve for vertical movement therein and having means carrying said air blowing nozzle for imparting said vertical movement thereto, a vertically apertured nut and means supporting said nut in fixed relation to said guide bar, and a vertically extending rotatable screw supported on said frame and engaging said nut whereby rotation of said rotatable screw moves said nut therealong, said fifth electric motor drivably engaging said rotatable screw for alternately opposite rotation of said screw to move said nozzle vertically and alternately between its said lower and raised positions.

* * * * *

UNITED STATES PATENT AND TRADEMARK OFFICE
CERTIFICATE OF CORRECTION

PATENT NO. : 5,478,229

DATED : December 26, 1995

INVENTOR(S) : Kato et al

It is certified that error appears in the above-indentified patent and that said Letters Patent is hereby corrected as shown below:

Column 1, line 18, after "bed" change "]" to --1--; line 31, "1]" should read --11--; line 37 "]3" should read --14--; line 38, "]3" should read --"13"; line 39, after "cylinder" insert --11--; line 40, "]12" should read --12--; same line 40 "]3" should read --13--; line 51, "]2" should read --12--.

Column 2, line 3, after "apparatus" delete "over a", same line 3, after "operates" insert --over a--; line 9, "fluctuates of" should read --fluctuates and--; line 11, after "requires" insert --a--; line 59, after "obliquely" insert --moving--.

Column 3, line 3, after "invention" delete "is"; line 36 after "pressure," insert --whereby--; line 43, "or" should read --for--.

Column 5, line 26 after "showing" delete "the"; line 29, before "details" delete "the".

UNITED STATES PATENT AND TRADEMARK OFFICE
CERTIFICATE OF CORRECTION

PATENT NO. : 5,478,229
DATED : December 26, 1995
INVENTOR(S) : Kato et al

It is certified that error appears in the above-indentified patent and that said Letters Patent is hereby corrected as shown below:

Column 6, line 15 after "device" insert --15--; line 16 after "die" insert --13--; line 66, "open" should read --opened--.

Column 7, line 1, "14a" should read --14b--; line 19 after "to" insert --be--; line 23, after "device" insert --21--; line 34, after "controller" delete "unit"; line 56, "pate" should read --plate--.

Column 8, line 32, "77," should read --71,--.

Column 10, line 33, after "on" insert --to--.

Column 11, line 66, delete "said".

Column 12, line 30, "257," should read --251,--.

Column 13, line 16, "44" should read --14--; line 17, "284" should read --281--; line 58, "27" should read --21--.

UNITED STATES PATENT AND TRADEMARK OFFICE
CERTIFICATE OF CORRECTION

PATENT NO. : 5,478,229
DATED : December 26, 1995
INVENTOR(S) : Kato et al

It is certified that error appears in the above-indentified patent and that said Letters Patent is hereby corrected as shown below:

Column 14, line 34, after "10a" insert --into--; line 36, after "plate" insert --114,--; line 52, before "controller" insert --a--.

Column 16, line 45, after "which" delete "an"; after "employs" insert --an--.

Column 17, line 53, "claim 1," should read --claim 3,--.

Signed and Sealed this

Sixth Day of June, 2000

Attest:

Q. TODD DICKINSON

Attesting Officer         Director of Patents and Trademarks